United States Patent
Jobs et al.

(10) Patent No.: US 7,890,778 B2
(45) Date of Patent: Feb. 15, 2011

(54) POWER-OFF METHODS FOR PORTABLE ELECTRONIC DEVICES

(75) Inventors: Steven P. Jobs, Palo Alto, CA (US); Scott Forstall, Mountain View, CA (US); Greg Christie, San Jose, CA (US); Stephen O. Lemay, San Francisco, CA (US); Marcel Van Os, San Francisco, CA (US); Imran Chaudhri, San Francisco, CA (US); Freddy Allen Anzures, San Francisco, CA (US); Patrick Lee Coffman, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 799 days.

(21) Appl. No.: 11/770,722

(22) Filed: Jun. 28, 2007

(65) Prior Publication Data
US 2008/0168290 A1    Jul. 10, 2008

Related U.S. Application Data

(60) Provisional application No. 60/883,786, filed on Jan. 6, 2007.

(51) Int. Cl.
*G06F 1/00* (2006.01)
*G06F 1/26* (2006.01)

(52) U.S. Cl. .............. 713/300; 713/320; 713/323; 713/324; 713/330; 345/23; 345/949; 345/960

(58) Field of Classification Search .......... 713/300, 713/320, 323, 324, 330; 345/23, 949, 960
See application file for complete search history.

(56) References Cited

U.S. PATENT DOCUMENTS

| | | | | |
|---|---|---|---|---|
| 5,553,296 A | * | 9/1996 | Forrest et al. | 713/323 |
| 5,889,509 A | * | 3/1999 | Sudo | 345/168 |
| 5,918,059 A | * | 6/1999 | Tavallaei et al. | 713/300 |
| 5,929,775 A | * | 7/1999 | Tsuchiyama | 340/7.37 |
| RE41,547 E | * | 8/2010 | Ha | 713/300 |
| 2006/0286966 A1 | | 12/2006 | Musto | 455/411 |

FOREIGN PATENT DOCUMENTS

| | | |
|---|---|---|
| DE | 102 28 568 A1 | 1/2004 |
| WO | WO 99/37077 | 7/1999 |
| WO | WO 04/001560 A1 | 12/2003 |

OTHER PUBLICATIONS

Zwick, et al, Studio 7 5 ED, "Designing for Small Screens, Passage" Designing for Small Screens, Lausanne, AVA Publishing SA, CH, Jan. 1, 2005, p. 60.
International Search Report and Written Opinion for International Application PCT/US2007/089022, mailed Jun. 10, 2008.

* cited by examiner

*Primary Examiner*—Thomas Lee
*Assistant Examiner*—Michael J Brown
(74) *Attorney, Agent, or Firm*—Morgan, Lewis & Bockius LLP

(57) ABSTRACT

In some embodiments of the invention, a graphical user interface in an electronic device with a touch screen display and power switch includes one or more user-interface objects to assist a user in powering-off the device while avoiding unintended power-off events due to inadvertent contact with the power switch or the touch screen display.

22 Claims, 14 Drawing Sheets

POWER-OFF METHODS FOR PORTABLE ELECTRONIC DEVICES

RELATED APPLICATIONS

This application claims priority to U.S. Provisional Patent Application No. 60/883,786, "Power-off Methods for Portable Electronic Devices," filed Jan. 6, 2007, which application is incorporated by referenced herein in its entirety.

This application is related to U.S. patent application Ser. No. 11/322,549, "Unlocking a Device by Performing Gestures on an Unlock Image," filed Dec. 23, 2005, and U.S. patent application Ser. No. 11/322,550, "Indication of Progress Towards Satisfaction of a User Input Condition," filed Dec. 23, 2005. Both of these applications are incorporated by reference herein.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; (11) U.S. Provisional Patent Application No. 60/879,469, "Portable Multifunction Device," filed Jan. 8, 2007; (12) U.S. Provisional Patent Application No. 60/879,253, "Portable Multifunction Device," filed Jan. 7, 2007; and (13) U.S. Provisional Patent Application No. 60/824,769, "Portable Multifunction Device," filed Sep. 6, 2006. All of these applications are incorporated by reference herein.

TECHNICAL FIELD

The disclosed embodiments relate generally to user interfaces on portable devices, and more particularly, to user interfaces for powering-off portable electronic devices.

BACKGROUND

Touch-sensitive displays (also known as "touch screens" or "touchscreens") are well known in the art. Touch screens are used in many electronic devices to display graphics and text, and to provide a user interface through which a user may interact with the devices. A touch screen detects and responds to contact on the touch screen. A device may display one or more soft keys, menus, and other user-interface objects on the touch screen. A user may interact with the device by contacting the touch screen at locations corresponding to the user-interface objects with which she wishes to interact.

Touch screens are becoming more popular for use as displays and as user input devices on portable devices, such as mobile telephones and personal digital assistants (PDAs). One problem associated with using touch screens on portable devices is the unintentional activation or deactivation of functions due to unintentional contact with the touch screen. Portable devices also provide external buttons, switches, etc. (collectively, "buttons") that are subject to unintentional engagement due to jostling of the device in a pocket, bag or case in which it is carried. This is also a problem as such switches can activate important device functions such as power-off and power-on. Therefore, there is a need for portable devices that prevent unintentional activation or deactivation of functions that are associated with the engagement of buttons and/or touch-screen display user interface elements. Ideally, devices with these protective features would still provide users with efficient and user-friendly access to device features and applications.

SUMMARY

In some embodiments a portable device with a display and a power switch is configured to prevent the accidental engagement of the power switch and the resulting unintended powering-off of the device. In some embodiments, after a user requests a power-off action (by depressing the power button, for example), a visual cue is shown on the display to provide the user with feedback on the progress of the power-off action. A method implemented in some embodiments includes: while the device is powered-up, detecting activation of the power switch; upon activation of the power switch, initiating display of a power-off visual sequence; as long as the power switch is activated, displaying elements of the power-off visual sequence; if the activation of the power switch ceases before the power-off visual sequence is displayed to completion, terminating the power-off action; and if the power-off visual sequence is displayed to completion while the power switch is activated, powering-off the device.

Some embodiments are also applicable to powering-on a portable electronic device, in which situation a visual sequence or other visual cue is displayed for a user after they activate the power switch. In some embodiments, this method includes: after detecting activation of the power switch, displaying a visual sequence to provide feedback on progress of the device-power-on process; and if the activation of the power switch ceases before the visual sequence is displayed to completion, terminating the power-on process.

In some embodiments, a portable device with a touch-screen display and a power switch is configured to prevent the accidental engagement of the power switch and the unintended powering-off of the device. In some embodiments the touch-screen display is used to provide a visual cue that indicates to the user how to complete a power-off action. A method implemented in some embodiments includes: while the device is powered-up, detecting activation of the power switch; upon activation of the power switch, displaying a power-off user cue that corresponds to a predefined user gesture with the touch screen display; detecting user interaction with the touch screen display; and within a predetermined time period of the activation of the power switch, if the user completes the predefined user gesture, completing the power-off action by powering-off the device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 1:
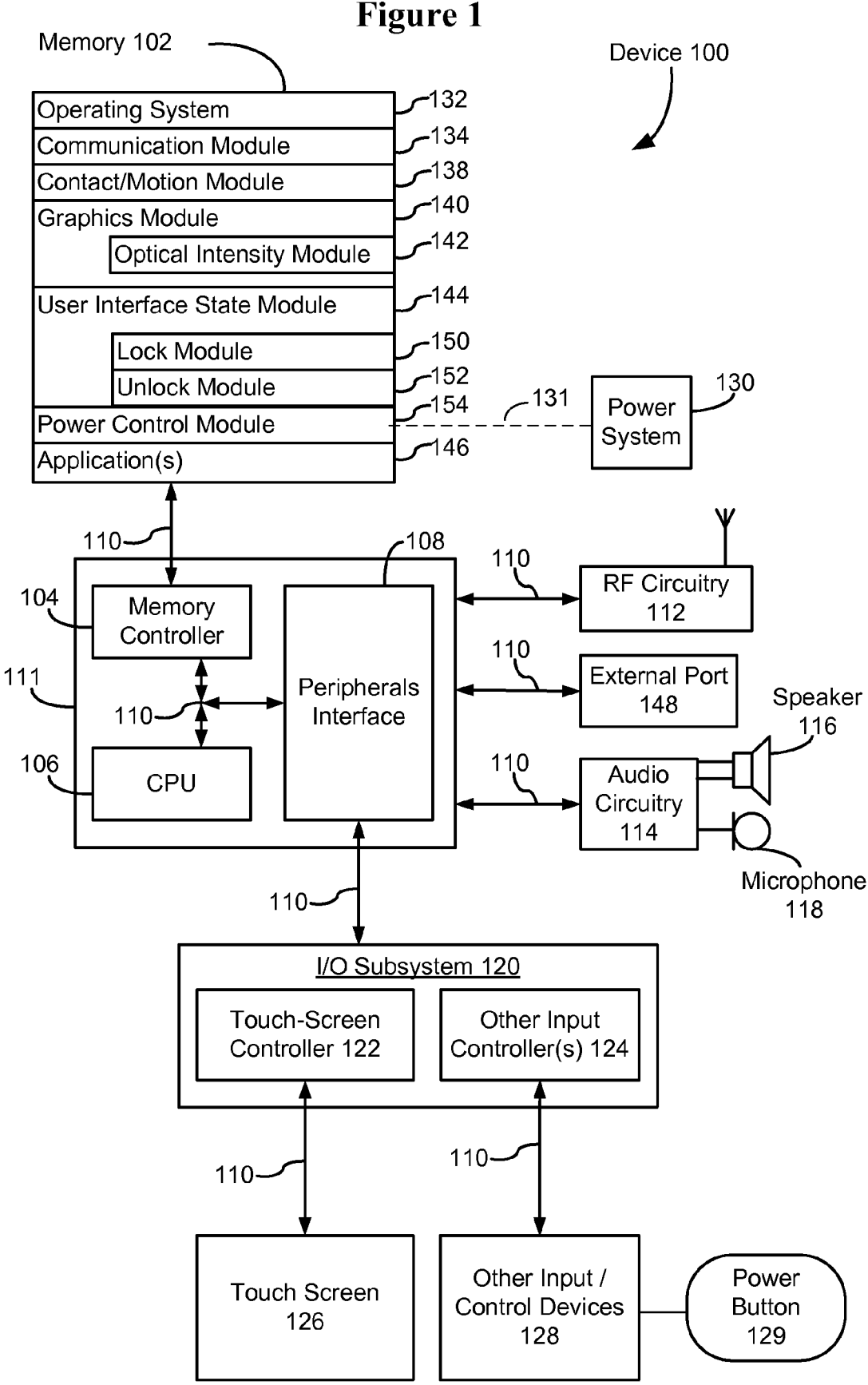
FIG. 1 is a block diagram illustrating a portable electronic device, according to some embodiments.

FIG. 1 illustrates a portable electronic device, according to some embodiments of the invention. The device 100 includes a memory 102, a memory controller 104, one or more processing units (CPU's) 106, a peripherals interface 108, RF circuitry 112, audio circuitry 114, a speaker 116, a microphone 118, an input/output (I/O) subsystem 120, a touch screen 126, other input or control devices 128, and an external port 148. These components communicate over the one or more communication buses or signal lines 110. The device 100 can be any portable electronic device, including but not limited to a handheld computer, a tablet computer, a mobile phone, a media player, a personal digital assistant (PDA), or the like, including a combination of two or more of these items. It should be appreciated that the device 100 is only one example of a portable electronic device 100, and that the device 100 may have more or fewer components than shown, or a different configuration of components. The various components shown in FIG. 1 may be implemented in hardware, software or a combination of both hardware and software, including one or more signal processing and/or application specific integrated circuits.

The memory 102 may include high speed random access memory and may also include non-volatile memory, such as one or more magnetic disk storage devices, flash memory devices, or other non-volatile solid state memory devices. In some embodiments, the memory 102 may further include storage remotely located from the one or more processors 106, for instance network attached storage accessed via the RF circuitry 112 or external port 148 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the CPU 106 and the peripherals interface 108, may be controlled by the memory controller 104.

The peripherals interface 108 couples the input and output peripherals of the device to the CPU 106 and the memory 102. The one or more processors 106 run various software programs and/or sets of instructions stored in the memory 102 to perform various functions for the device 100 and to process data.

In some embodiments, the peripherals interface 108, the CPU 106, and the memory controller 104 may be implemented on a single chip, such as a chip 111. In some other embodiments, they may be implemented on separate chips.

The RF (radio frequency) circuitry 112 receives and sends electromagnetic waves. The RF circuitry 112 converts electrical signals to/from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 114, the speaker 116, and the microphone 118 provide an audio interface between a user and the device 100. The audio circuitry 114 receives audio data from the peripherals interface 108, converts the audio data to an electrical signal, and transmits the electrical signal to the speaker 116. The speaker converts the electrical signal to human-audible sound waves. The audio circuitry 114 also receives electrical signals converted by the microphone 118 from sound waves. The audio circuitry 114 converts the electrical signal to audio data and transmits the audio data to the peripherals interface 108 for processing. Audio data may be retrieved from and/or transmitted to the memory 102 and/or the RF circuitry 112 by the peripherals interface 108. In some embodiments, the audio circuitry 114 also includes a headset jack (not shown). The headset jack provides an interface between the audio circuitry 114 and removable audio input/output peripherals, such as output-only headphones or a headset with both output (headphone for one or both ears) and input (microphone).

The I/O subsystem 120 provides the interface between input/output peripherals on the device 100, such as the touch screen 126 and other input/control devices 128, and the peripherals interface 108. The I/O subsystem 120 includes a touch-screen controller 122 and one or more input controllers 124 for other input or control devices. The one or more input controllers 124 receive/send electrical signals from/to other input or control devices 128. The other input/control devices 128 may include physical buttons (e.g., push buttons, rocker buttons, etc.), dials, slider switches, sticks, and so forth.

The touch screen 126 provides both an output interface and an input interface between the device and a user. The touch-screen controller 122 receives/sends electrical signals from/to the touch screen 126. The touch screen 126 displays visual output to the user. The visual output may include text, graphics, video, and any combination thereof. Some or all of the visual output may correspond to user-interface objects, further details of which are described below.

The touch screen 126 also accepts input from the user based on haptic and/or tactile contact. The touch screen 126 forms a touch-sensitive surface that accepts user input. The touch screen 126 and the touch screen controller 122 (along with any associated modules and/or sets of instructions in the memory 102) detects contact (and any movement or break of the contact) on the touch screen 126 and converts the detected contact into interaction with user-interface objects, such as one or more soft keys, that are displayed on the touch screen. In an exemplary embodiment, a point of contact between the touch screen 126 and the user corresponds to one or more digits of the user. The touch screen 126 may use LCD (liquid crystal display) technology, or LPD (light emitting polymer display) technology, although other display technologies may be used in other embodiments. The touch screen 126 and touch screen controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 126. The touch-sensitive display may be analogous to the multi-touch sensitive tablets described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference. However, the touch screen 126 displays visual output from the portable device, whereas touch sensitive tablets do not provide visual output. The touch screen 126 may have a resolution in excess of 100 dpi. In an exemplary embodiment, the touch screen 126 may have a resolution of approximately 168 dpi. The user may make contact with the touch screen 126 using any suitable object or appendage, such as a stylus, finger, and so forth.

A touch-sensitive display 126 in some embodiments may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 126 or an extension of the touch-sensitive surface formed by the touch screen 126.

The device 100 also includes a power system 130 for powering the various components. The power system 130 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

In some embodiments, the software components include an operating system 132, a communication module (or set of instructions) 134, a contact/motion module (or set of instructions) 138, a graphics module (or set of instructions) 140, a user interface state module (or set of instructions) 144, a power control module 154, and one or more applications (or set of instructions) 146.

The operating system 132 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 134 facilitates communication with other devices over one or more external ports 148 and also includes various software components for handling data received by the RF circuitry 112 and/or the external port 148. The external port 148 (e.g., Universal Serial Bus (USB), FIREWIRE, etc.) is adapted for coupling directly to other devices or indirectly over a network (e.g., the Internet, wireless LAN, etc.).

The contact/motion module 138 detects contact with the touch screen 126, in conjunction with the touch-screen controller 122. The contact/motion module 138 includes various software components for performing various operations related to detection of contact with the touch screen 126, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some embodiments, the contact/motion module 138 and the touch screen controller 122 also detects contact on the touchpad.

The graphics module 140 includes various known software components for rendering and displaying graphics on the touch screen 126. Note that the term "graphics" includes any object that can be displayed to a user, including without limitation text, web pages, icons (such as user-interface objects including soft keys), digital images, videos, animations and the like.

In some embodiments, the graphics module 140 includes an optical intensity module 142. The optical intensity module 142 controls the optical intensity of graphical objects, such as user-interface objects, displayed on the touch screen 126. Controlling the optical intensity may include increasing or decreasing the optical intensity of a graphical object. In some embodiments, the increase or decrease may follow predefined functions.

The user interface state module 144 controls the user interface state of the device 100. The user interface state module 144 may include a lock module 150 and an unlock module 152. The lock module detects satisfaction of any of one or more conditions to transition the device 100 to a user-interface lock state and to transition the device 100 to the lock state. The unlock module detects satisfaction of any of one or more conditions to transition the device to a user-interface unlock state and to transition the device 100 to the unlock state.

The power control module 154 detects, mediates, and implements user power-off and power-on requests. It is responsive to inputs provided by the user interface state module 144, touch-screen controller 122 and the power system 130. It also issues control signals 131 to the power system 130 to implement user power-off requests. To prevent inadvertent engagement of the power button 129 from resulting in unintended power-off or power-on actions of the device 100, the power control module 154 provides user feedback in relation to the implementation and progress of power requests and, in some situations, enables user interaction via the touch screen display 126 to affirmatively complete a power-off or power-on request. Further details regarding some embodiments for implementing power-off requests in particular are described below. In addition, many of the techniques described in the above-referenced and incorporated patent application ("Indication of Progress Towards Satisfaction of a User Input Condition") are relevant to the power-off and power-on control methods and systems described herein.

The one or more applications 146 can include any applications installed on the device 100, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player (which plays back recorded music stored in one or more files, such as MP3 or AAC files), etc.

In some embodiments, the device 100 may include the functionality of an MP3 player, such as an iPod (trademark of Apple Computer, Inc.). The device 100 may, therefore, include a 36-pin connector that is compatible with the iPod. In some embodiments, the device 100 may include one or more optional optical sensors (not shown), such as CMOS or CCD image sensors, for use in imaging applications.

In some embodiments, the device 100 is a device where operation of a predefined set of functions on the device is performed exclusively through the touch screen 126 and, if included on the device 100, the touchpad. By using the touch screen and touchpad as the primary input/control device for operation of the device 100, the number of physical input/control devices (such as push buttons, dials, and the like) on the device 100 may be reduced. In some embodiments, the device 100 includes the touch screen 126, the touchpad, a power button 129 (which can be any manner of physical interface device, including but not limited to, a push button, switch, dial, slider, rocker button or touchpad) for powering the device on/off and locking the device, a volume adjustment rocker button and a slider switch for toggling ringer profiles. As described further below, the power button 129 may be used to turn the power on/off on the device by depressing the button and holding the button in the depressed state for a predefined time interval, or may be used to lock the device by depressing the button and releasing the button before the predefined time interval has elapsed. In an alternative embodiment, the device 100 also may accept verbal input for activation or deactivation of some functions through the microphone 118.

The predefined set of functions that are performed exclusively through the touch screen and the touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

User Interface and Power States

The device 100 may have a plurality of user interface states. A user interface state is a state in which the device 100 responds in a predefined manner to user input. In some embodiments, the plurality of user interface states includes a user-interface lock state and a user-interface unlock state. In some embodiments, the plurality of user interface states includes states for a plurality of applications.

In the user-interface lock state (hereinafter the "lock state"), the device 100 is powered on and operational but ignores most, if not all, user input. That is, the device 100 takes no action in response to user input and/or the device 100 is prevented from performing a predefined set of operations in response to the user input. The predefined set of operations may include navigation between user interfaces and activation or deactivation of a predefined set of functions. The lock state may be used to prevent unintentional or unauthorized use of the device 100 or activation or deactivation of functions on the device 100. When the device 100 is in the lock state, the device 100 may be said to be locked. In some embodiments, the device 100 in the lock state may respond to a limited set of user inputs, including input that corresponds to an attempt to transition the device 100 to the user-interface unlock state or input that corresponds to powering the device 100 off. In other words, the locked device 100 responds to user input corresponding to attempts to transition the device 100 to the user-interface unlock state or powering the device 100 off, but does not respond to user input corresponding to attempts to navigate between user interfaces. It should be appreciated that even if the device 100 ignores a user input, the device 100 may still provide sensory feedback (such as visual, audio, or vibration feedback) to the user upon detection of the input to indicate that the input will be ignored.

In embodiments where the device 100 includes the touch screen 126, while the device 100 is locked, a predefined set of operations, such as navigation between user interfaces, is prevented from being performed in response to contact on the touch screen 126 when the device 100 is locked. In other words, when the contact is being ignored by the locked device 100, the touch screen may be said to be locked. A locked device 100, however, may still respond to a limited class of contact on the touch screen 126. The limited class includes contact that is determined by the device 100 to correspond to an attempt to transition the device 100 to the user-interface unlock state.

In the user-interface unlock state (hereinafter the "unlock state"), the device 100 is in its normal operating state, detecting and responding to user input corresponding to interaction with the user interface. A device 100 that is in the unlock state may be described as an unlocked device 100. An unlocked device 100 detects and responds to user input for navigating between user interfaces, entry of data and activation or deactivation of functions. In embodiments where the device 100 includes the touch screen 126, the unlocked device 100 detects and responds to contact corresponding to navigation between user interfaces, entry of data and activation or deactivation of functions through the touch screen 126.

The device 100 may have a plurality of power states that include: OFF, ON, OFF_IN_PROGRESS or ON_IN_PROGRESS. When the power state is OFF, the device 100 can be transitioned to the ON state by user engagement of the power button 129. The device is in the ON_IN_PROGRESS state while it is transitioning from the OFF to the ON power state. During this transition a visual cue may be displayed on the display 126 to inform the user of the progress of the power-on action. In some embodiments, this cue can be implemented as described in reference to FIGS. 2 and 6 (which is directed to implementation of a power-off action), displaying a sequence of images of symbols that progresses as the power-on action proceeds through to completion.

When the power state is ON, the transition of the device 100 to the OFF state can be initiated by user engagement of the power button 129 or any other predefined method of requesting a power off action, such as selecting a menu option or making a gesture on the touch screen 126. The device is in the OFF_IN_PROGRESS state while it is transitioning from the ON to the OFF power state. As described in greater detail below, in some embodiments a power-off action proceeds without user intervention apart from the need for the user to depress the power button 129 for a predefined period of time. In this situation a visual cue may be displayed on the display 126 to inform a user of the progress of the power-off action. In some embodiments completion of the power-off action occurs when the user completes a specific gesture. In this situation a representation of the gesture may be displayed on the touch screen display 126, which assists the user in successfully completing the gesture.

Powering-Off a Device Via Gestures

Figure 2:
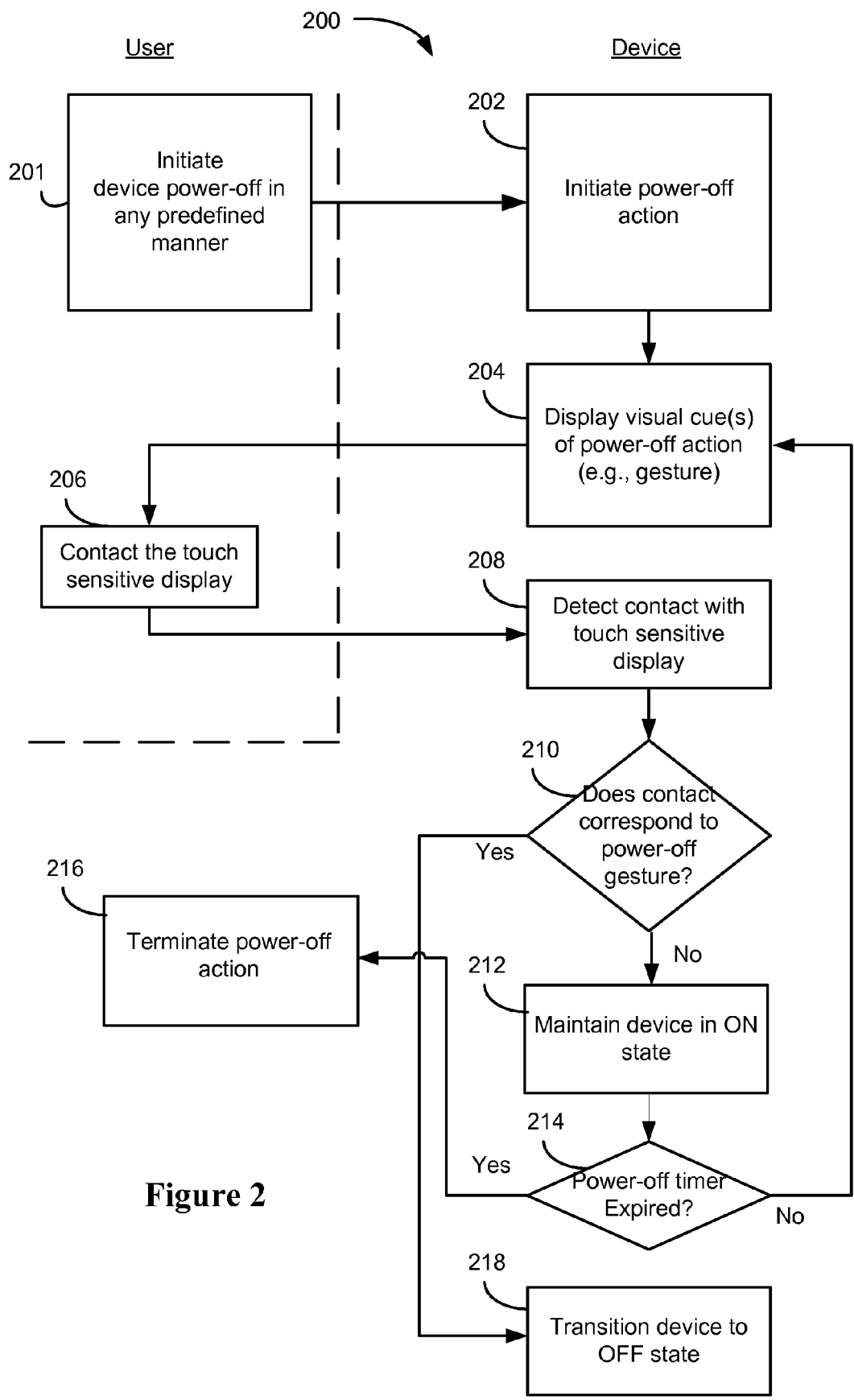
FIG. 2 is a flow diagram illustrating a process for transitioning a device to a power-off state, according to some embodiments.

FIG. 2 is a flow diagram illustrating a process 200 for transitioning a device 100 from the ON state to the OFF state (or, powering-off the device) according to some embodiments of the invention. As used herein, "transitioning" from one state to another refers to the process of going from one state to another. The process may be, as perceived by the user, instantaneous, near-instantaneous, gradual, or proceeding at any suitable rate. The progression of the process may be controlled automatically by the device, such as the device 100 (FIG. 1), independent of the user, once the process is activated; or it may be controlled by the user. While the process flow 200 described below includes a number of operations that appear to occur in a specific order, it should be apparent that these processes may include more or fewer operations, which may be executed serially or in parallel (e.g., using parallel processors or a multi-threading environment).

The user initiates the process 200 of powering-off the device 100 with a predefined action(s), such as depressing the power button 129 or selecting a menu option (201). In response, the device 100 initiates a power-off procedure in which it can transition from the ON to the OFF state (202). The device may be powered-off (that is, transition completely from the ON state to the OFF state) upon satisfaction of any of one or more power-off conditions. These power-off conditions, which are described below, may include a particular user interaction with the device 100, such as a predefined user gesture on the touch screen 126, and may also include a condition that the user interaction occur within a predefined time. In some embodiments, the user may be allowed to specify the events that serve as power-off conditions. For example, the user may configure the device to transition to the OFF state upon the elapsing of a predefined button depression time that is longer than a predefined or user selected value.

In some embodiments, the device 100 displays on the touch screen 126 one or more visual cues of a power-off action that the user may perform to complete the power-off procedure (204). The visual cue(s) provide hints or reminders of the power-off action to the user. The visual cues may be textual, graphical or any combination thereof. In some embodiments, the visual cues are displayed upon the occurrence of particular events while the device is in the ON state. The particular events that trigger display of the visual cues may include presumed user inputs such as the engagement of the power button 129, contact with a particular region of the touch screen that can be used to power-off the device, or selection of a power-off option from a menu of the device 100. The device 100, when not displaying the visual cues, may be maintained in a locked state, may power down the touch screen (which helps to conserve power) or display other objects on the touch screen, such as a screen saver or information that may be of interest to the user (e.g., battery charge remaining, date and time, network strength, etc.). As described in the above-referenced, co-pending application ("Indication of Progress Towards Satisfaction of a User Input Condition"), in some embodiments a user may initiate a power-off event while the device 100 is in the locked state. In this case, the device 100 can ignore interactions with the touch screen 126 that are extraneous to either the power-off procedure or an unlock procedure for unlocking the device. If the device is locked and the power-off procedure is not completed, the device 100 can remain in the locked state. That said, in some embodiments the device 100 need not implement a locked or unlocked state.

In some embodiments, the power-off action includes user contact with the touch screen 126. In some embodiments, the power-off action is a predefined gesture performed on the touch screen. As used herein, a gesture is a motion of an object/user appendage (e.g., a finger) making contact with the touch screen. For example, the predefined gesture may include a contact of the touch screen at a predefined edge (e.g., the left edge) to initialize the gesture, a horizontal movement of the point of contact to the opposite edge while maintaining continuous contact with the touch screen, and a breaking of the contact at the opposite edge to complete the gesture.

Even if the touch screen is locked, the user may initiate contact with the touch screen, i.e., touch the touch screen (206), and initiate the gesture to complete the power-off process. For convenience of explanation, contact on the touch screen in the process 200 and in other embodiments described below will be described as performed by the user using at least one hand using one or more fingers. However, it should be appreciated that the contact may be made using any suitable object or appendage, such as a stylus, finger, etc. The contact may include one or more taps on the touch screen, maintaining continuous contact with the touch screen, movement of the point of contact while maintaining continuous contact, a breaking of the contact, or any combination thereof. In some embodiments (e.g., embodiments in which the touch screen uses capacitive sensing), "continuous contact" with the touch screen includes light contact with the touch screen as well as close-to-the-screen hovering. For example, in these embodiments a swipe gesture may be successful even if the user's finger very slightly lifts off the touch screen during the gesture, so long as it remains within a maximum hover distance of the screen throughout the gesture. The maximum hover distance is determined by the characteristics of the sensing components of the touch screen.

The device detects the contact on the touch screen (208). If the contact does not correspond to an attempt to perform the power-off action, or if the contact corresponds to a failed or aborted attempt by the user to perform the power-off action (210—No), then the device remains ON (212). For example, if the predefined power-off action is a horizontal movement of the point of contact across the touch screen while maintaining continuous contact with the touch screen 126 and the detected contact is a series of random taps on the touch screen, then the device will remain ON because the contact does not correspond to the power-off action.

In some embodiments there is power-off timer that is started when the user initiates a power-off event. In such embodiments the user may be given additional opportunities to complete the power-off gesture as long as the power-off timer has not expired (214—No). If the user has not successfully completed the power-off gesture (210—No) by the time the power-off timer expires (214—Yes), the device 100 terminates the power-off procedure (216) and remains in the ON state (212). The use of a power-off timer is optional as the user alternatively can be given a fixed number of opportunities (e.g., a number between one and five) to perform the power-off gesture correctly, after which number of unsuccessful attempts the power-off procedure is terminated. In the most basic scenario, a user is given one opportunity to complete the power-off gesture each time a power-off action is initiated.

If the contact corresponds to a successful performance of the power-off action; i.e., the user performs the power-off action successfully (210—Yes), the device transitions to the OFF state (218). For example, if the power-off action is a horizontal movement of the point of contact across the touch screen while maintaining continuous contact with the touch screen, and the detected contact is the horizontal movement with the continuous contact, then the device transitions to the power-off state.

In some embodiments, at step 210 the device begins the process of transitioning to the OFF state upon detection of any contact on the touch screen and aborts the transition as soon as the device determines that the contact does not correspond to a power-off action or is a failed/aborted power-off action. For example, if the power-off action is a predefined gesture, the device may begin the process of transitioning to the OFF state as soon as it detects the initial contact of the gesture and continues the progression of the transition as the gesture is performed. If the user aborts the gesture before it is completed, the device aborts the transition and remains in the ON state. If the gesture is completed, the device completes the transition to the OFF state and powers-off. As another example, if the power-off action is a horizontal movement of the point of contact across the touch screen while maintaining continuous contact with the touch screen, and the user taps the touch screen once, the device begins the process of power-off as soon as it detects the tap but also aborts the process soon after because it realizes that the tap is just a tap and does not correspond to the predefined power-off action. In yet another example, if the device detects contact with more than a predefined portion (e.g., fifty percent) of the touch screen, the device assumes that the power-off action was accidental (e.g., because the device is inside a protective cover, or inside a person's pocket or the like), and the power-off process is immediately terminated (216).

In some embodiments, in addition to visual feedback, the electronic device can supply non-visual feedback to indicate progress towards completion of the power-off action. The additional feedback may include audible feedback (e.g., sound(s)) or physical feedback (e.g., vibration(s)).

Figure 3:
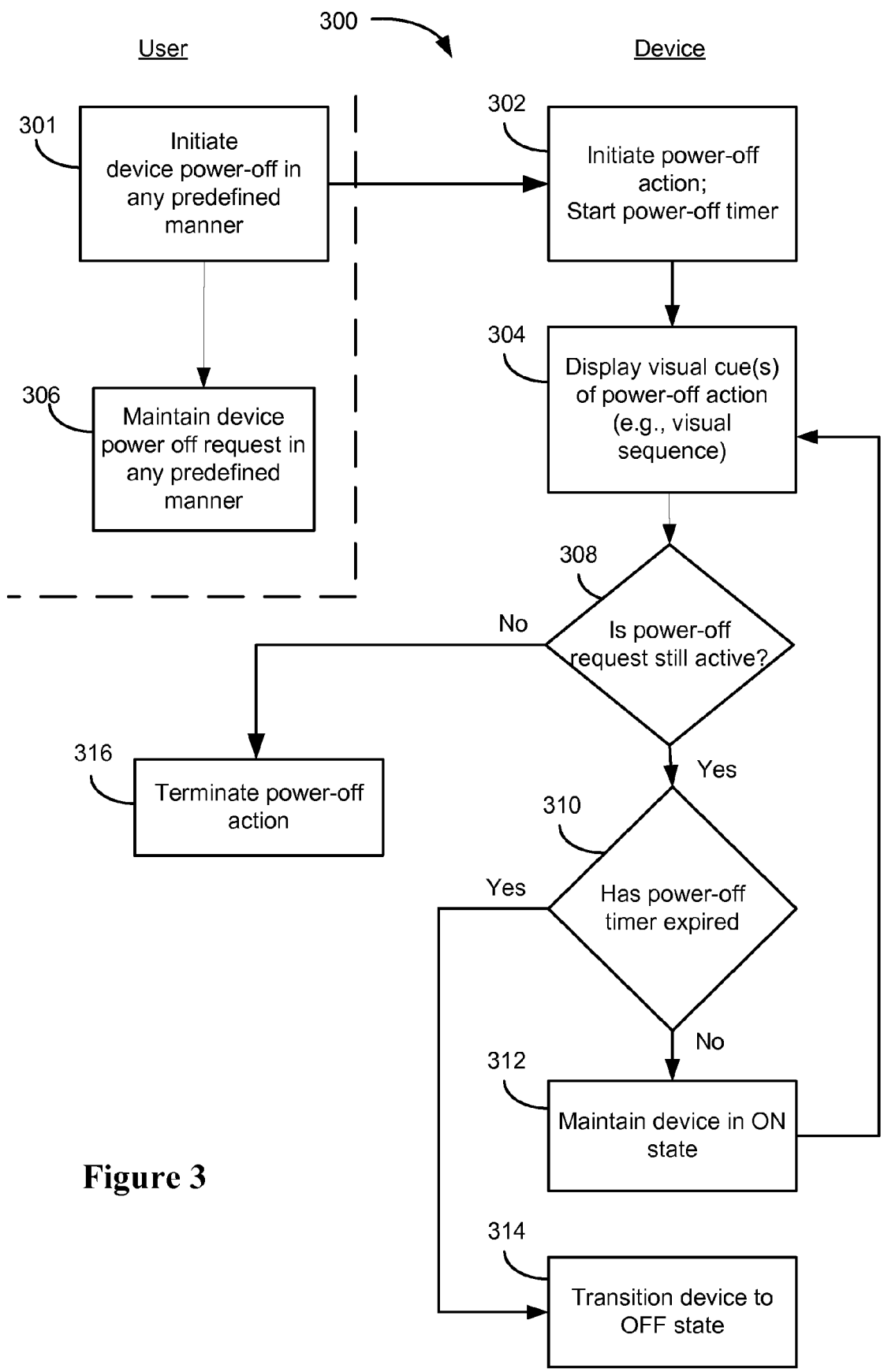
FIG. 3 is a flow diagram illustrating a process for transitioning a device to a power-off state, according to some embodiments.

In some embodiments, as described in reference to FIG. 3 of the above-referenced patent application ("Indication of Progress Towards Satisfaction of a User Input Condition") the visual cue displayed in conjunction with the power-off process indicates the user gesture needed to complete the power-off process and also shows the user how to interact with the displayed cue itself to complete the power-off procedure. In other words, the user initiates the gesture by touching the spot defined (by the displayed visual cue) on the display as the beginning of the gesture and then traces the path of the gesture illustrated on the touch screen display to its end. This method reduces user error that may attend the user's attempt to mimic gestures on the touch screen without additional interaction cues.

In some embodiments, the power-off gesture includes dragging a power-off image to a location on the touch screen that meets one or more predefined power-off criteria. In other words, the user makes contact with the touch screen at a location corresponding to the power-off image and then performs the predefined gesture while maintaining continuous contact with the touch screen, dragging the image to the location that meets the predefined power-off criteria. In some embodiments, the power-off action is completed by breaking the contact with the touch screen (thus releasing the power-off image) upon completion of the predefined gesture.

A location meeting one or more predefined power-off criteria is a location on the touch screen that is predefined as a location to which the unlock image is to be dragged in order to power-off the device. The location(s) may be defined narrowly or broadly and may be one or more particular locations on the touch screen, one or more regions on the touch screen, or any combination thereof. For example, the location may be defined as a particular marked location, areas at each of the four corners of the touch screen, or a quadrant of the touch screen, etc.

In some embodiments, the interaction includes dragging the power-off image to a predefined location on the touch screen. For example, the power-off action may include dragging the unlock image from one corner of the touch screen to another corner of the touch screen. As another example, the power-off action may include dragging the unlock image from one edge of the touch screen to the opposite edge. In these embodiments, the emphasis is on the final destination of the power-off image. Thus, in these embodiments, the user can drag the power-off image from its initial location along any desired path. As long as the power-off image reaches the predefined location and is released at that location, the device is powered-off. It should be appreciated that the predefined location may be, as described above, defined narrowly or broadly and may be one or more particular locations on the touch screen, one or more regions on the touch screen, or any combination thereof.

In some other embodiments, the power-off action includes dragging the power-off image along a predefined path. For example, the power-off action may include dragging the power-off image clockwise along the perimeter of the touch screen (the path being the perimeter of the touch screen), from one of the corners and back. As another example, the power-off action may include dragging the power-off image from one edge of the touch screen to the opposite edge in a linear path. In these embodiments, the emphasis is on the path along which the power-off image moves. Because of the emphasis on the path, the final location to which the power-off image is to be moved may be defined broadly. For example, the power-off action may be to drag the power-off image from its initial location, along the predefined path, to any spot within a predefined region on the touch screen. The predefined path may include one or more straight lines or lines with twists and turns.

FIG. 3 is a flow diagram illustrating a process 300 for transitioning a device 100 from the ON state to the OFF state (or, powering-off the device) according to some embodiments of the invention. The process 300 is similar to the process 200 (FIG. 2) with the addition of visual cues that are displayed to show the progress of the power-off procedure. This process also does not include a user gesture on the touch screen to complete the power-off procedure. Instead, the user keeps the power button depressed for a predetermined time, which corresponds to the time needed to complete display of the visual power-off cue. While the process flow 300 described below includes a number of operations that appear to occur in a specific order, it should be apparent that these processes can include more or fewer operations, which can be executed serially or in parallel (e.g., using parallel processors or a multi-threading environment).

The user initiates the device power-off procedure (301) as described in reference to FIG. 2. In some embodiments the user can issue a power-off request by depressing the power button 129. In other embodiments, other power-off initiation action 301 may be used, such as selecting a defined region of the touch panel or selecting a menu option. Once the user issues a power-off request, the device 100 initiates its power-off procedure and, in some situations, starts a power-off timer that determines the amount of time a user needs to engage the power button 129 before the system is powered-off (302). As part of the power-off procedure the device displays a visual cue to show the progress of the power off process (304).

In some embodiments, the visual power-off cue can be a sequence of images or symbols that is displayed one by one as the power-off action proceeds. In some of these embodiments, different portions of the visual cue are displayed corresponding to progress of the power-off procedure. For example, when the visual cue is a series of images, the portion of the visual cue that is displayed is a single one of the images that composes the sequence. These images can be displayed sequentially, or built up over time (e.g., leaving the first images in place while subsequent images in the series are displayed) so the state of completion of the sequence is apparent to a user. Any type of images or symbols can be shown in the sequence, including, without limitation, squares and other quadrilateral shapes, circles, ovals, star-like shapes, other geometrical shapes, alphanumeric characters, icons, avatars, cartoons, photos, alphanumeric characters, or text messages (e.g., indicating to the user how much longer they need to keep the power-button depressed). In some embodiments, the images or symbols in the sequence are identical or substantially similar.

In some embodiments, the visual power-off cue can be a timer that displays a decrementing, or incrementing value that corresponds to the time remaining for the user to keep the power button depressed. In some embodiments, the visual power-off progress cue can also be an animation whose state of completeness would be apparent to a user. In these different embodiments, presentation of the visual cue provides the user with feedback as to how long they need to keep the power button depressed to complete the power-off action.

Referring again to FIG. 3, the user maintains the power-off request in any predefined manner (such as continuing to depress the power button 129) (306) if they wish to complete the power-off action. If the power-off request is still active (e.g., the user is still actively depressing the power button) (308—Yes) and the power-off timer has not yet expired (310—No), the device is maintained in the ON state (i.e. powered-up) (312). If the power-off request is still active (meaning that the user is actively depressing the power button) (308—Yes) and the power-off timer has expired (310—Yes), the device is transitioned to the OFF state (i.e. powered-off) (314). If, prior to the power-off time expiring (310—No), the power-off request ceases to be active (308—No), the device 100 terminates the power-off action.

Figure 4A:
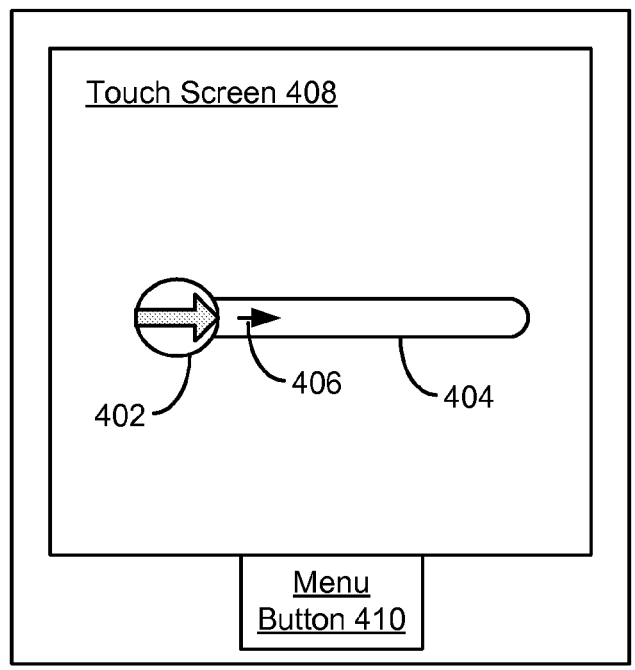
FIGS. 4A-4B illustrate the graphical user interface (GUI) of a device for a power-off action, according to some embodiments.
Figure 4B:
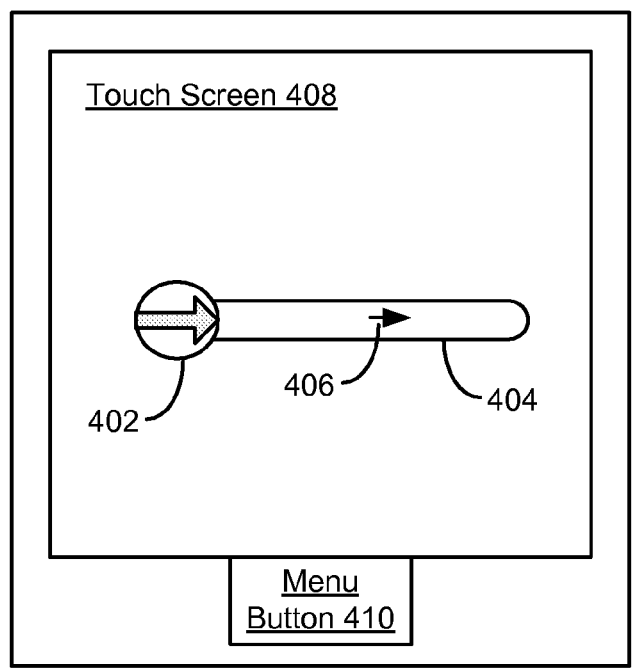

FIGS. 4A-4B illustrate the graphical user interface (GUI) of a device that is involved in, or preparing for, a power-off action, according to some embodiments of the invention. In FIG. 4A, the device 400 (corresponding to the device 100 of FIG. 1) includes a touch screen 408 and a menu button 410, which can be a touch sensitive region of the device 400, an onscreen menu item, or an actual power button 129 as described in reference to FIG. 1. In FIG. 4A, the device 400 is powered-on and the touch screen 408 is displaying a power-off image 402 and visual cues. The visual cues shown include a channel 404 indicating the path of the gesture/movement along which the power-off image 402 is to be dragged, similar to a groove along which a slider switch moves; and one or more arrows 406 indicating the direction of the gesture/movement. The end of the channel 404 (in FIGS. 4A-4B and 5A-5D, the "end" of the channel is the right end of the channel) also serves as a predefined location to which the power-off image 402 is to be dragged. The power-off image 402 may also include an arrow to further remind the user of the direction of the gesture/movement. As described above, the visual cues and the power-off image may be displayed by the device 400 upon the user performing a turn-off initiation action.

In some embodiments, the arrows 406 and the arrow on the power-off image 402 may be animated. For example, the arrow on the power-off image 402 may appear and disappear in a pulse-like manner and the arrows 406 may emanate from one end of the channel 406 in sync with the pulsing of the arrow on the unlock image 402. As shown in FIG. 4B, the arrow 406 may move along the channel 404 and disappear when it moves to the end of the channel 404.

The visual cues illustrated in FIGS. 4A and 4B remind the user that the power-off action is a predefined gesture that includes a horizontal movement of the finger (and thus moving the point of contact) along the channel 404, from the beginning of the channel 404, where the unlock image is initially located, to the end of the channel 404. It should be appreciated, however, that the visual cues shown in FIGS. 4A-4B are merely exemplary and that more or fewer visual cues, or alternative visual cues may be used. The content of the visual cues may be based on the particulars of the power-off action.

Figure 5A:
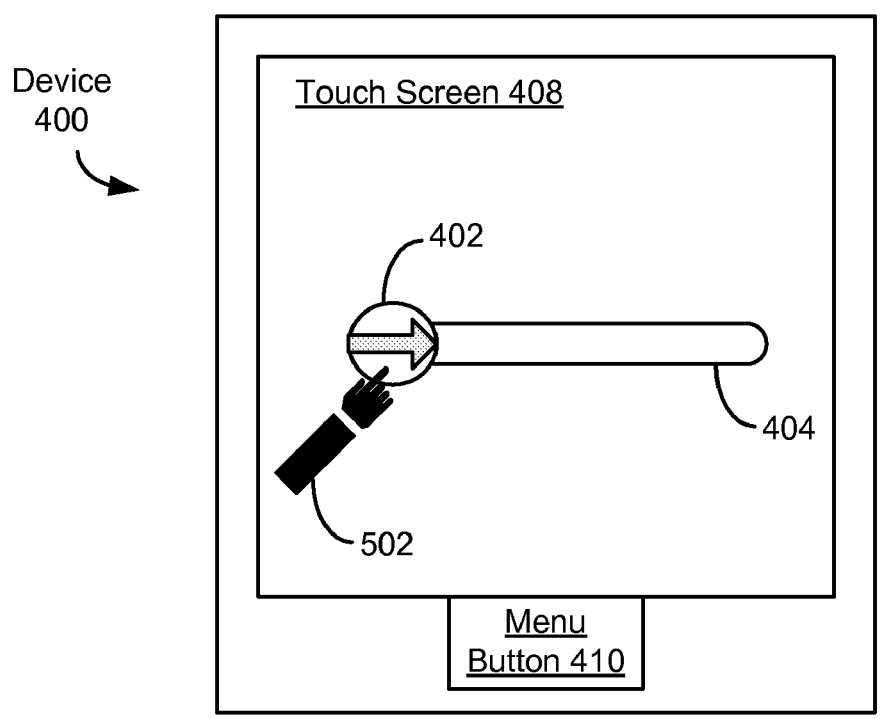
FIGS. 5A-5D illustrate the GUI display of a device at various points of the performance of a power-off action, according to some embodiments.

FIGS. 5A-5D illustrate the GUI of a device at various points of the performance of a power-off action gesture, according to some embodiments of the invention. As discussed above, the power-off sequence can be initiated by any of a variety of power-off initiation actions, such as pressing the device's power button while the device is on. In some embodiments, if the device has not been used for at least a predefined or user-specified amount of time, the touch screen 408 is initially in sleep mode and/or dark, and the screen 408 displays a power-off image 402 when the menu button 410 is touched. In FIG. 5A, the user, represented by the hand and finger 502 (not drawn to scale), begins the power-off action by touching the touch screen 408 of device 400 with her finger 502. The user touches the touch screen 408 at the location corresponding to the power-off image 402, which is located initially at the left end of the channel 404. The contact, either overlapping with the power-off image 402 or in proximity to the power-off image 402, is detected by the device 400 and is determined to be an attempt to power-off the device, based on the fact that the user 502 is interacting with the power-off image 402.

Figure 5B:
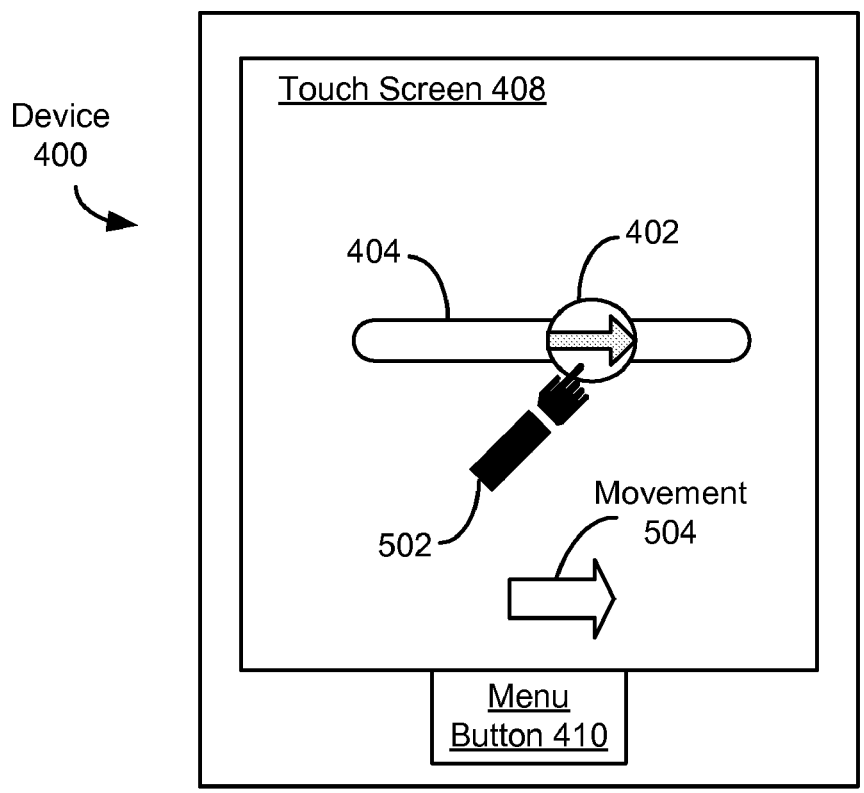

In FIG. 5B, the user is in the process of performing the gesture by moving her finger, which is in continuous contact with the touch screen 408, in the direction of movement 504. The power-off image 402 is dragged along the channel 404 as a result of the gesture. The channel 404 reminds the user that the power-off gesture is a horizontal motion. In some embodiments, the channel 404 indicates the predefined location (in FIGS. 5A-5D, the right end of the channel) to which the user drags the unlock image 402 to complete the unlock action and/or the predefined path along which the user drags the unlock image 402 to complete the unlock action.

Figure 5C:
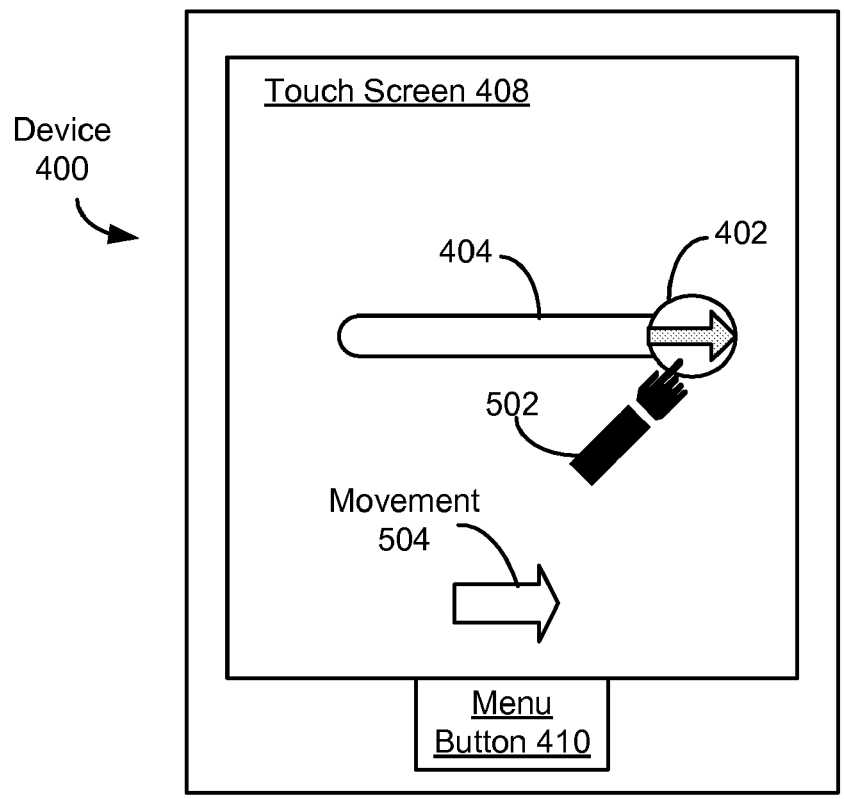
Figure 5D:
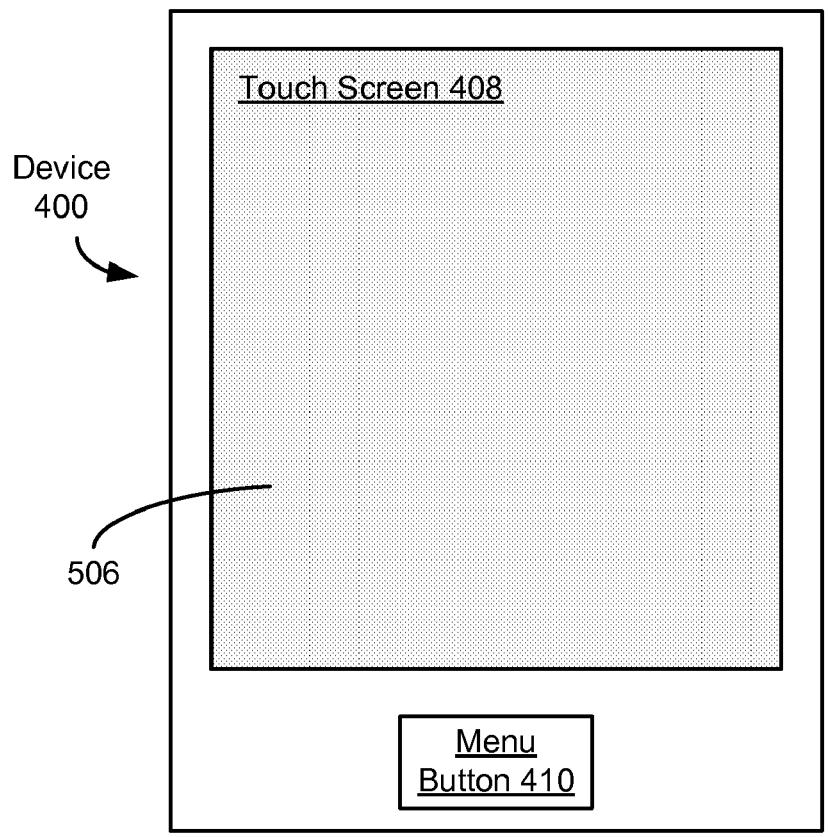

In FIG. 5C, the user has dragged the unlock image 402 to the right end of the channel 404. Once the user releases the unlock image 402 at the right end of the channel 404, the power-off action is complete. Upon completion of the power-off gesture, the device powers-off the device 400 and the screen is darkened (506, FIG. 5D).

In some embodiments, the power-off image 402 may also be used to indicate failure of performance of the power-off action. For example, if the user breaks the contact with the touch screen before the power-off image reaches the right end of the channel 404, the power-off action has failed. The device 400 may display the power-off image 402 returning to its initial position on the left end of the channel 404, allowing the user to attempt the power-off action again, if she so chooses. In some embodiments, the device goes back to normal operation if no gesture is applied in a predetermined period of time.

In some embodiments, the user may power-off the device 400 by contacting the touch screen 408 and moving the point of contact horizontally along a fraction of the channel 404, i.e., the user need not move all the way to the right end of the channel. In some embodiments, the user may power-off the device 400 by making contact anywhere on the touch screen 408 and moving the point of contact horizontally as if he or she were following the channel 404 (i.e., the user need not interact directly with the displayed power-off image).

Figure 6:
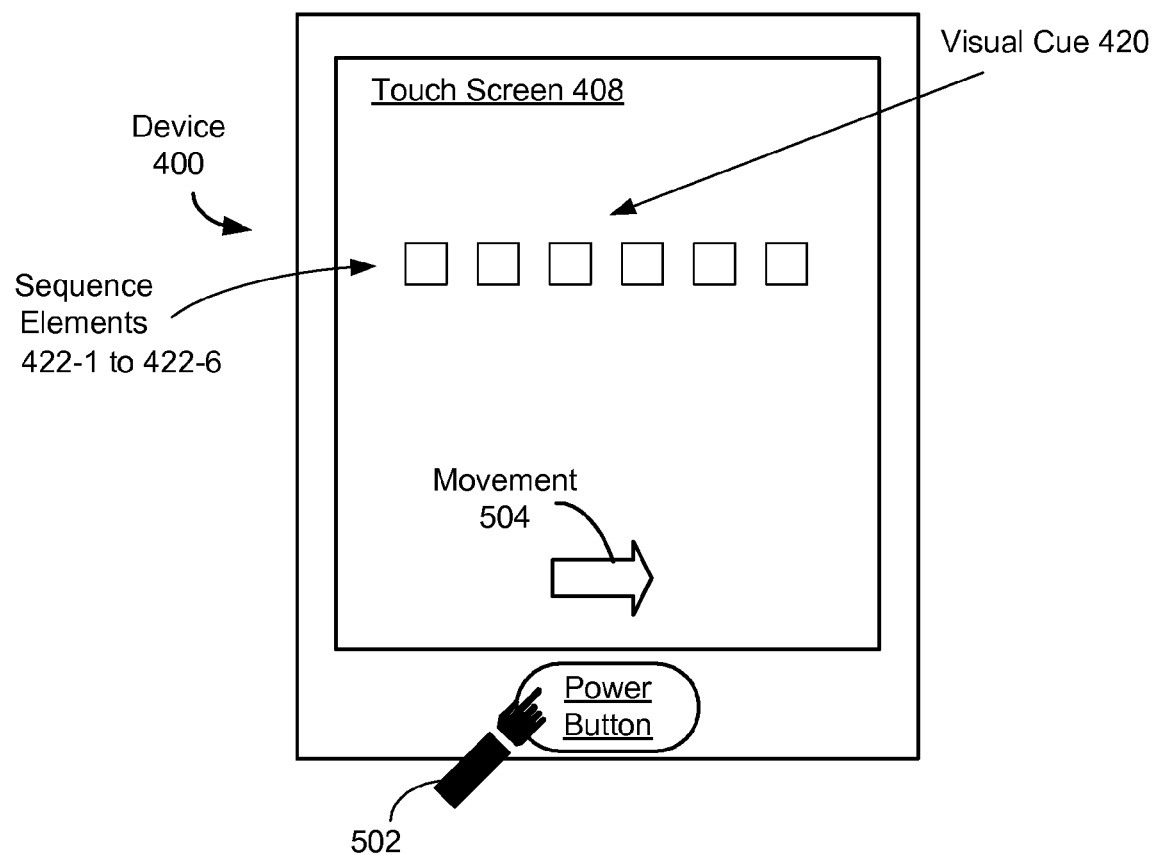
FIG. 6 illustrates the GUI display of a device for a power-off action, according to some embodiments.

FIG. 6 shows the GUI of a device that is involved in, or preparing for, a power-off action, according to some embodiments of the invention. In FIG. 6, the device 400 (corresponding to the device 100 of FIG. 1) includes a touch screen 408 and a menu button 410, which can be a touch sensitive region of the device 400, an onscreen menu item, or an actual power button 129, as described in reference to FIG. 1. The device 400 is powered-on and the touch screen 408 is displaying a power-off visual cue 420 that includes a predefined power-off sequence 422 with individual elements 422-1 to 422-6 and, optionally, a directional indicator (arrow) 504 that shows in which direction the sequence 422 will proceed as the corresponding power-off action proceeds. The visual cue shown includes a horizontal arrangement of open boxes that, in some embodiments, are filled in as the power-off action proceeds—the last box being filled in when the power-off action is complete and the device is about to be powered-down. As described above, the visual cues 420, 504 may be displayed by the device 400 upon the occurrence of an event(s) that indicate that the user is or may be requesting a power-off action. In some embodiments, this screen can be displayed even when the device 400 is in a locked state.

The visual cue 420 can be implemented as any useful image that can convey to the user feedback about a power-off action (or power-on action) that is in progress. As shown in FIG. 6, the visual cue 420 can be a sequence of geometrical shapes or symbols, including, but not limited to, squares, rectangles, other quadrilateral shapes, circles, ovals, star-like shapes, geometrical shapes with more than four sides, or any other suitable shapes. The visual cue 420 can also be implemented as a sequence 422 of images or symbols, such as, without limitation, alpha-numeric characters, with or without inter-sequence order, an animation of a predefined user gesture (e.g., a power-off gesture), a text description of the predefined user gesture, or an illustration of the user gesture. The visual queue 420 may include a collection of pictures, or cues that make use of shading or color transitions (e.g., light to dark colors) to show the progress of the power-off action.

The visual cue 420 can also be implemented as a message to a user advising them as to how long they need to engage the power button 129 or menu button 410, or simply as a count down timer that displays the remaining time in the power-off action (or a decreasing or increasing numerical counter counting down or up to a predetermined value). In some embodiments an addition visual cue can be provided to inform the user when the power-off action has been completed (just before the device is turned off). This can be done with audio or visual cues, including generating a tone, blinking or otherwise changing the brightness of the display, or displaying a message that the power-off action is about to be implemented. In some embodiments, the cue 420 and the arrow 504 and the arrow on the power-off image 402 may be animated. For example, the visual cue(s) 420 may appear and disappear in a pulse-like manner and the arrow 504 may emanate (in alignment with the sequence 422) from one side of the touch screen display 408 to the other.

The visual cues illustrated in FIG. 6 remind the user that a power-off action is a proceeding and that she still needs to complete a predefined gesture or interaction with the device 400 for the power-off action to be completed. Completion of the predefined gesture or interaction may include the user interacting with the visual cue as displayed on the touch screen display. Alternately, the predefined gesture may involve the user depressing the power button 129 (FIG. 1) (or menu button 410) for a predetermined time, such as 2 seconds. It should be appreciated, however, that the visual cues shown in FIG. 6 are merely exemplary and that more or fewer visual cues, or alternative visual cues may be used. The content of the visual cues may be based on the particulars of the power-off action.

Figure 7A:
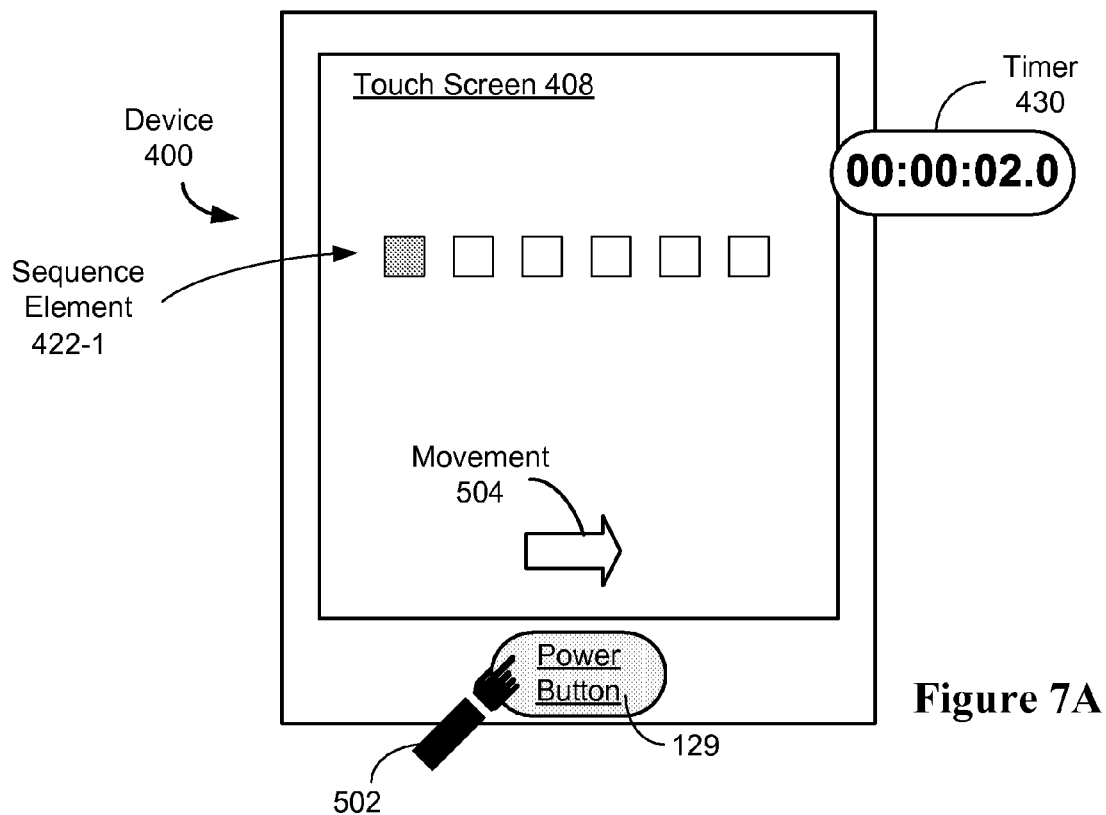
FIGS. 7A-7D illustrate the GUI display of a device at various points of the performance of a power-off action, according to some embodiments.

FIGS. 7A-7D illustrate the GUI of a device at various points of the performance of a power-off action gesture, according to some embodiments of the invention. In FIG. 7A, the user, represented by the hand and finger 502 (not drawn to scale), begins the power-off action by touching the power button 129 of the device 400 with her finger 502 (shown by the shading of the power button 129). A timer 430 is shown that illustrates the amount of time remaining until the power-off action can be completed by the device 400. In some embodiments, the time shown on the timer 430 is maintained by the power control module 154 (FIG. 1), which also monitors the power-state of the device 400 (including ON, ON_IN_PROGRESS, OFF and OFF_IN_PROGRESS) and manages and monitors any requested power-off or power-on actions. In the embodiment illustrated in FIGS. 7A-7D, the timer is a count-down timer that counts down from a preset value (in this embodiment, 2 seconds, as shown in FIG. 7A). In some embodiments the timer can be implemented as an elapsed time (count-up) timer and in other embodiments is optional (the user instead being given a predefined number of opportunities to complete the power-off procedure). In the embodiment illustrated in FIGS. 7A-7D, when the timer reaches 00:00:00 seconds, the power-off action has been completed and the device 400 is powered-off.

In some embodiments, the predefined user gesture (a power-off gesture) includes movement substantially from a first location on the touch screen display to a second location on the touch screen display. In some embodiments, the predefined user gesture includes continuous user contact with the touch screen display as the user makes the predefined user gesture between the first and second locations. In some embodiments, the continuous user contact with the touch screen display is substantially along the path of a visual cue displayed on the touch screen display (e.g., as discussed above with reference to FIGS. 5A and 5B). The predefined user gesture may include touching a plurality of locations displayed on the touch screen display. In some embodiments, completion by the user of the predefined gesture may be accomplished by user contact with each of the plurality of locations at separate times (e.g., in a predefined sequence). Alternately, in some embodiments completion by the user of the predefined gesture may be accomplished by the user touching the plurality of locations on the touch screen display substantially simultaneously. In some embodiments, the predefined user gesture is made with the user's finger in contact with the touch screen display, while in other embodiments, the predefined user gesture may be made with either the user's finger or another object in contact with the touch screen display.

In FIG. 7A the user has just initialized the power-down process by touching the power button 129 (shown by the shading of the power button 129). As a result, only the first box 422-1 of the sequence 422 is shaded. The other boxes 422-2 to 422-6 of the sequence are shown in outline to indicate how much time comparatively is remaining in the power-off action (and also how much longer comparatively the user will need to depress the power button 129 in order to turn the device 400 off). In some embodiments, the un-shaded elements of the sequence 422 are not shown at all.

Figure 7B:
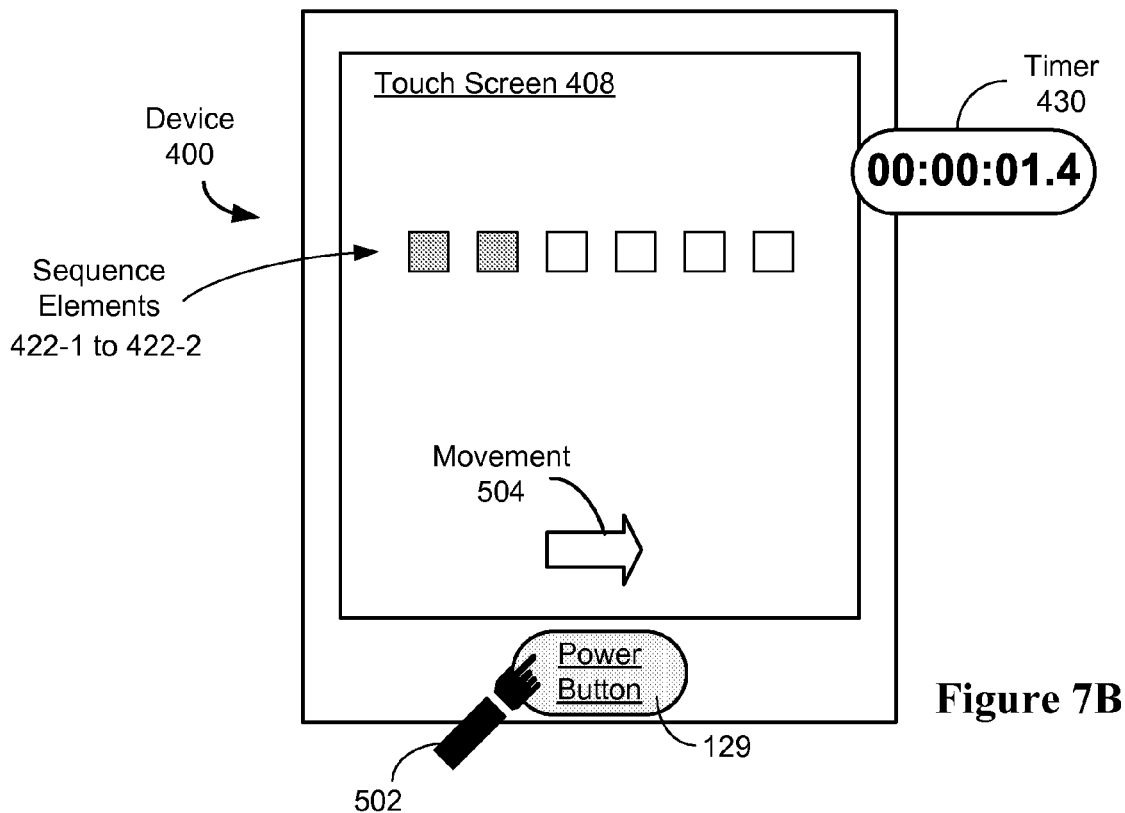
Figure 7C:
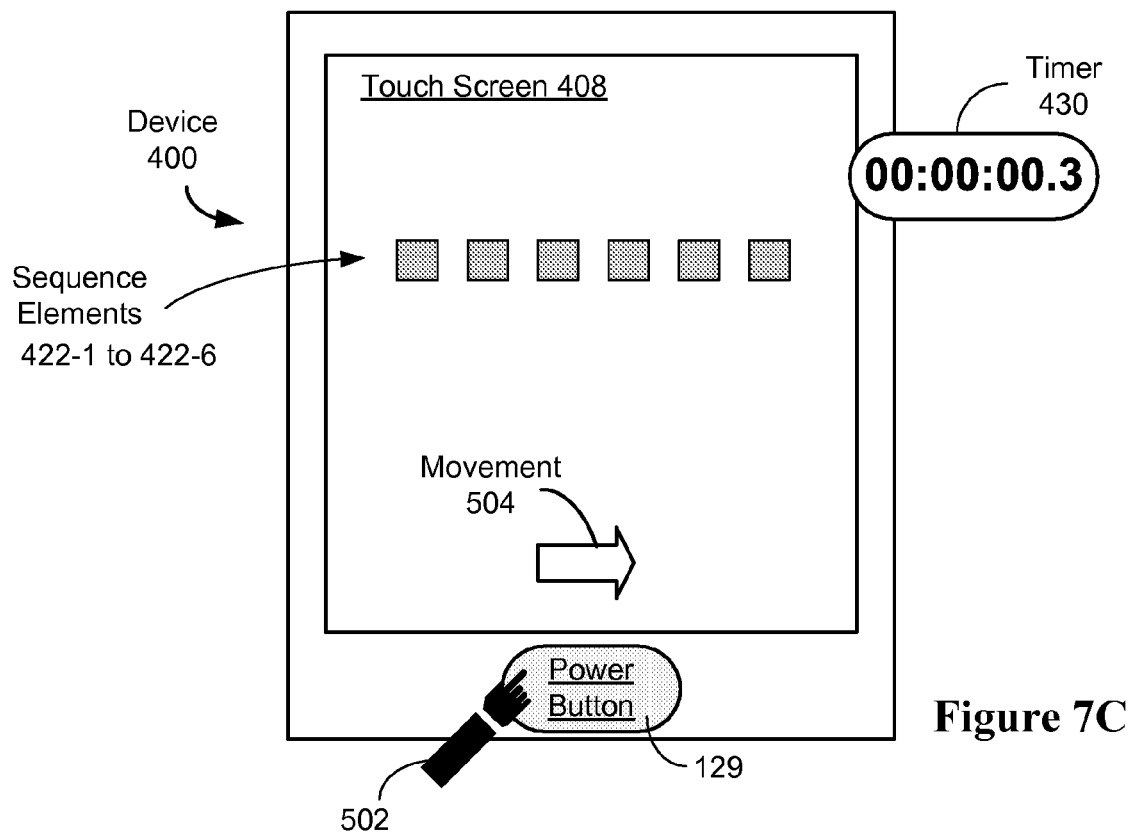
Figure 7D:
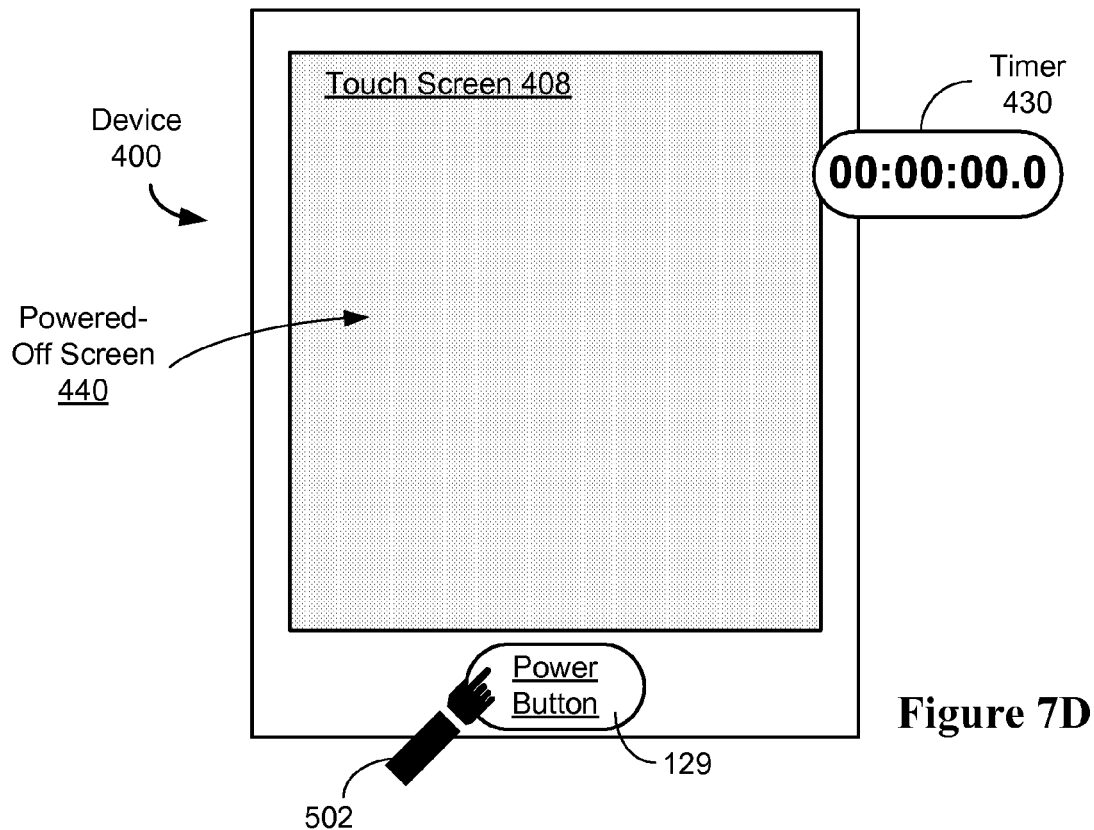

In the subsequent FIGS. 7B and 7C the power-off action proceeds from 01.4 seconds to 00.3 seconds remaining (as shown on the timer 430) as the user 502 continues to depress the power button 129. As the action proceeds, the number of shaded squares increases from two in FIG. 7B to six in FIG. 7C. In FIG. 7D the timer 430 is at 00.0 seconds, indicating that the user has completed the necessary interaction for the device 400 to be powered down. As a result, the touch screen 408 is darkened and the device 400 powered down. In some embodiments, if at any time prior to the expiration of the timer 430 the user 502 had released the power button 129, the power-off action would have terminated, the device would have remained powered on, and the power-off display, including the sequence 422, would have disappeared from the touch screen 408, possibly after a visual or audible signal indicated that the requested power-off action was not completed.

Figure 8:
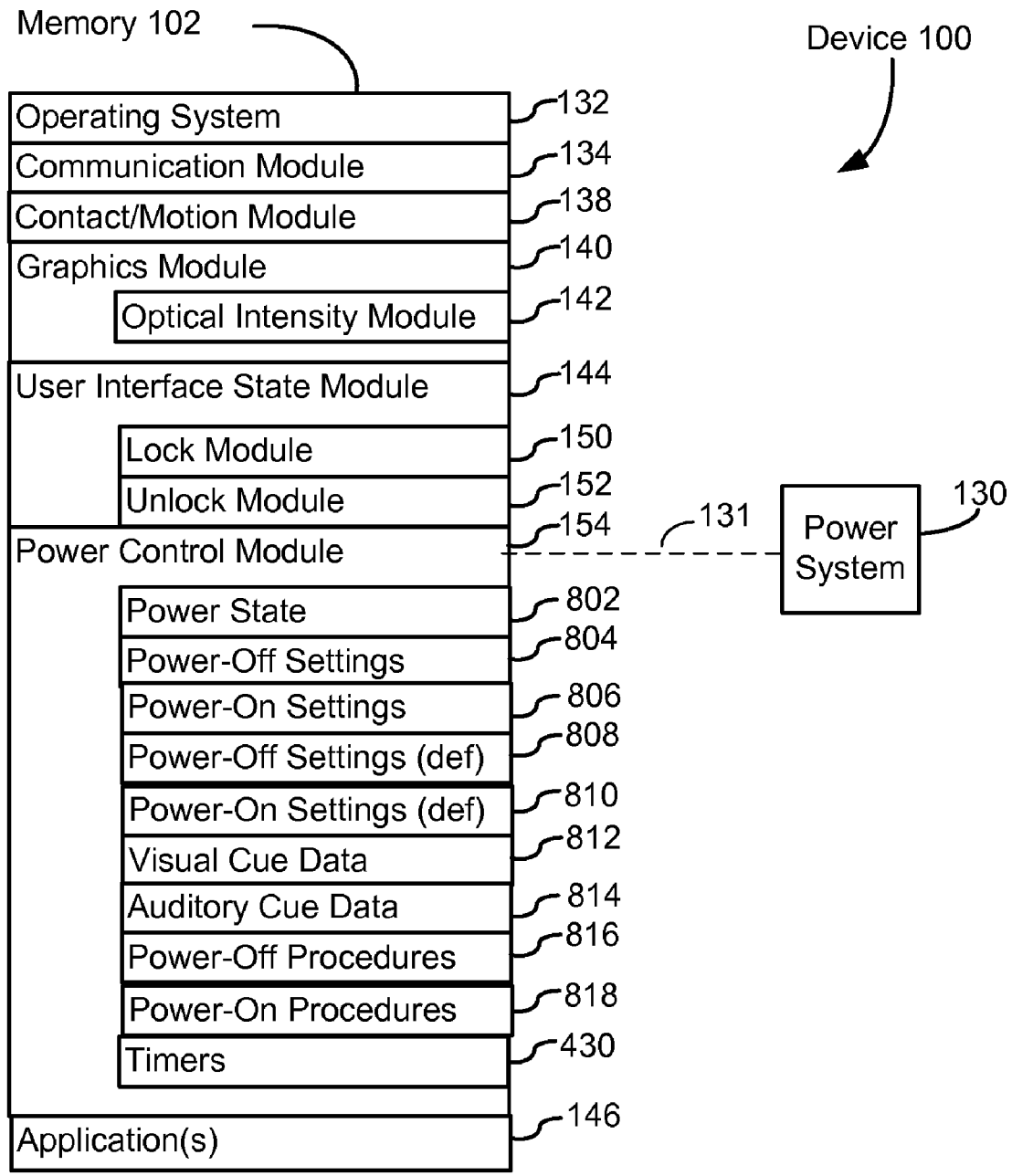
FIG. 8 is a block diagram illustrating additional details of elements of a portable electronic device related to a power-off action, according to some embodiments.

FIG. 8 is a block diagram illustrating additional details of elements of a portable electronic device 100 related to a power-off action, according to some embodiments. In particular, FIG. 8 shows additional features of the power control module 154 of FIG. 1.

As described in reference to FIG. 1, the power control module 154 detects, mediates, and implements user power-off and power-on requests. It is responsive to inputs provided by the user interface state module 144, touch-screen controller 122 and the power system 130. It also issues control signals 131 to the power system 130 to implement user power-off requests. To prevent the inadvertent engagement of the power button 129 and a resulting unintended power-off or power-on actions of the device 100, the power control module 154 provides user feedback visually (on the display 126) and the speaker 116 in relation to the implementation and progress of power requests and, in some situations, enables user interaction via the touch screen display 126 to affirmatively complete a power-off or power-on request. The power control module 154 also maintains information 802 on the power state of the device 100, which includes, without limitation, the following states: ON, ON_IN_PROGRESS, OFF, and OFF_IN_PROGRESS. In some embodiments the power control module maintains one or more timers 430 that track the progress of a power-off or power-on event that is in progress. In these embodiments the power control module 154 may also maintain settings 804 and 806 for the times required to complete a power-off or power-on event. In some embodiments the device 100 is configured with default values 808, 810 of the settings 804, 806 that can be modified by users. The power control module 154 also maintains a repository of visual and auditory cue data 812, 814 that corresponds to the auditory and visual cues that are presented to users in conjunction with power transition events, and power-off and power-on procedures/instructions 816, 818 that, when, executed on the device 100, determine how the device responds to, an interacts with, a user who has initiated a power transition event.

Indication of Progress Towards Satisfaction of a User Input Condition

Figure 9:
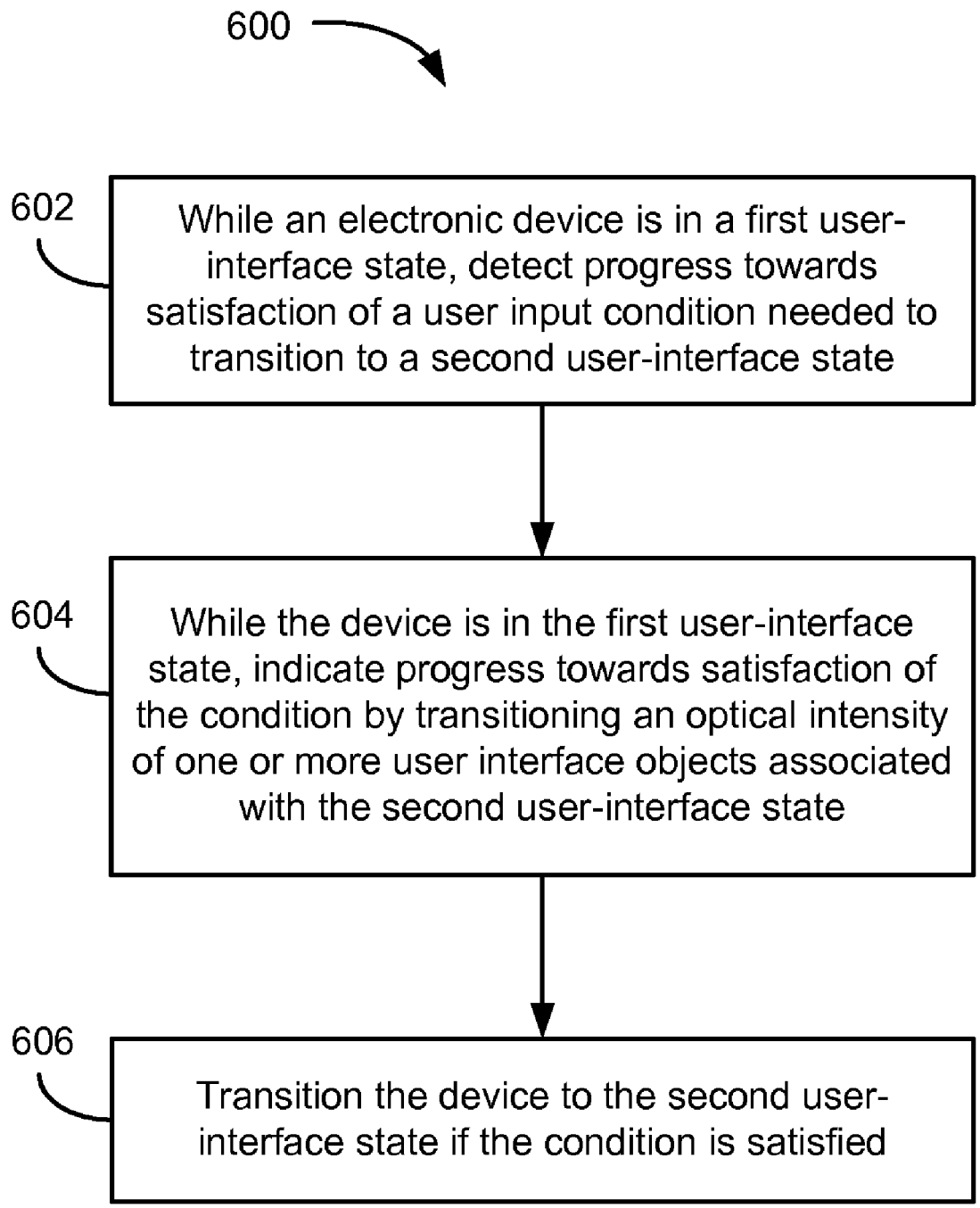
FIG. 9 is a flow diagram illustrating a process for indicating progress towards satisfaction of a user input condition according to some embodiments of the invention.

FIG. 9 is a flow diagram illustrating a process 600 for indicating progress towards satisfaction of a user input condition according to some embodiments of the invention. While the process flow 600 described below includes a number of operations that appear to occur in a specific order, it should be apparent that these processes can include more or fewer operations, which can be executed serially or in parallel (e.g., using parallel processors or a multi-threading environment).

While an electronic device is in a first user-interface state, progress is detected (602) towards satisfaction of a user input condition needed to transition to a second user-interface state. In some embodiments, the first user-interface state is for a first application and the second user-interface state is for a second application. In some embodiments, the first user-interface state is a lock state and the second user-interface state is an unlock state.

While the device is in the first user-interface state, progress is indicated (604) towards satisfaction of the condition by transitioning an optical intensity of one or more user interface objects associated with the second user-interface state. The change in optical intensity of the user-interface objects provides a user with sensory feedback of the progress in transitioning between user interface states.

In some embodiments, in addition to visual feedback, the device supplies non-visual feedback to indicate progress towards satisfaction of the user input condition. The additional feedback may include audible feedback (e.g., sound(s)) or physical feedback (e.g., vibration(s)).

The device transitions (606) to the second user-interface state if the condition is satisfied. In some embodiments, in addition to visual feedback, the device supplies non-visual feedback to indicate satisfaction of the user input condition. The additional feedback may include audible feedback (e.g., sound(s)) or physical feedback (e.g., vibration(s)).

The optical intensity of a user-interface object, as used herein, is the object's degree of visual materialization. The optical intensity may be measured along a scale between a predefined minimum and a predefined maximum. In some embodiments, the optical intensity may be measured along a logarithmic scale. In some embodiments, the optical intensity may be perceived by users as a transparency effect (or lack thereof) applied to the user-interface object. In some embodiments, the minimum optical intensity means that the object is not displayed at all (i.e., the object is not perceptible to the user), and the maximum optical intensity means that the object is displayed without any transparency effect (i.e., the object has completely materialized visually and is perceptible to the user). In some other embodiments, the optical intensity may be the visual differentiation between the user-interface object and the background, based on color, hue, color saturation, brightness, contrast, transparency, and any combination thereof.

In some embodiments, the optical intensity of the user-interface objects to be displayed in the second user-interface state is increased smoothly. Smoothly may include a transition time that is greater than a pre-defined threshold, for example, 0.2 s, 1 s or 2 s. The rate of the transition of the optical intensity may be any predefined rate.

In some embodiments, the indication of progress towards completion of the user input condition is a function of the user's satisfaction of the condition. For example, for a transition to a power-off/unlock state, the indication of progress towards completion is a function of the user's performance of a power-off/unlock action. For a linear function, the indication of progress is 10% complete when the power-off/unlock action is 10% complete; the indication of progress is 50% complete when the power-off/unlock action is 50% complete, and so forth, up to 100% completion of the power-off/unlock action, at which point the transition to the power-off/unlock state occurs. Correspondingly, for a linear function, the transition of the optical intensity from an initial value to a final value is 10% complete when the power-off/unlock action is 10% complete; the transition is 50% complete when the unlock action is 50% complete, and so forth, up to 100% completion of the power-off/unlock action, at which point the optical intensity is at its final value. In some embodiments, the user may perceive the optical intensity transition as a fading in of the user-interface objects as the power-off/unlock action is performed. It should be appreciated that the function need not be linear and alternative functions may be used, further details of which are described below, in relation to FIGS. 11A-11C.

If the user input condition includes a predefined gesture then the indication of progress of the gesture may be defined in terms of how much of the gesture is completed and how much of the gesture is remaining. For example, if the gesture includes moving the finger from one edge of the screen to the opposite edge horizontally, then the indication of progress may be defined in terms of the distance between the two edges because the distance remaining objectively measures how much further the user has to move her finger to complete the gesture.

If the user input condition includes dragging an image to a predefined location, then the indication of progress may be defined in terms of the distance between the initial location of the image and the predefined location to which the image is to be dragged in order to complete the input condition.

If the user input condition includes dragging an image along a predefined path, then the indication of progress may be defined in terms of the length of the predefined path.

Figure 10A:
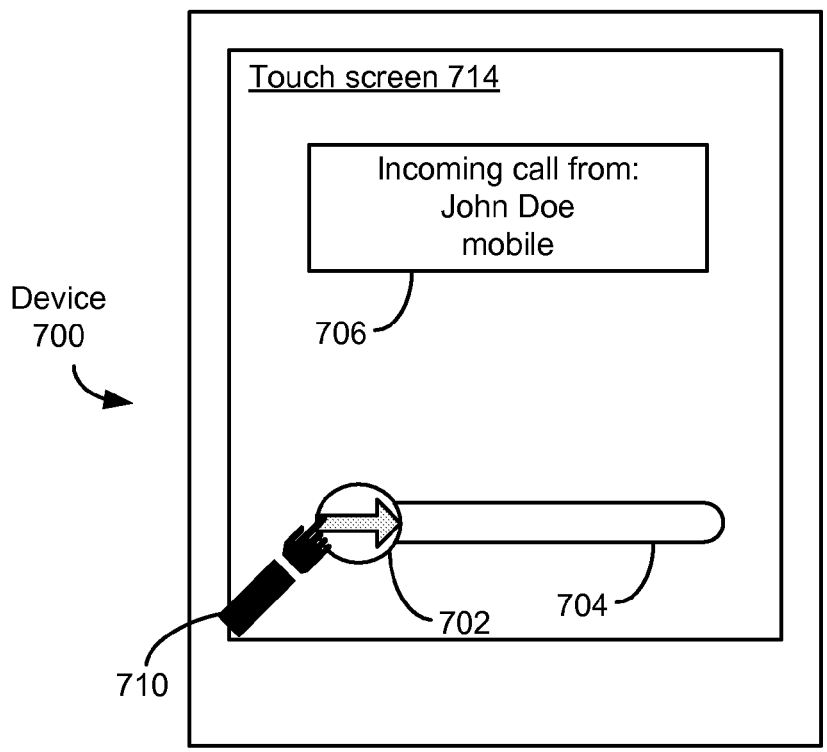
FIGS. 10A-10D illustrate the GUI display of a device that is transitioning the optical intensity of user-interface objects, according to some embodiments of the invention.

FIGS. 10A-10D illustrate the GUI of a device that is transitioning the optical intensity of user-interface objects concurrent with a transition from a first user interface state to a second user interface state, according to some embodiments of the invention. This illustration is shown for an unlock action, but is equally applicable to a power-off action, except that the end result would be the powering-off the device 700. In FIG. 10A, the device 700 is locked and has received an incoming call. The device 700 is displaying a prompt 706 to the user, informing the user of the incoming call, on the touch screen 714. The device is also displaying the unlock image 702 and channel 704 so that the user can unlock the device 700 in order to accept or decline the incoming call. The user begins the unlock action by making contact on the touch screen with her finger 710 on the unlock image 702.

Figure 10B:
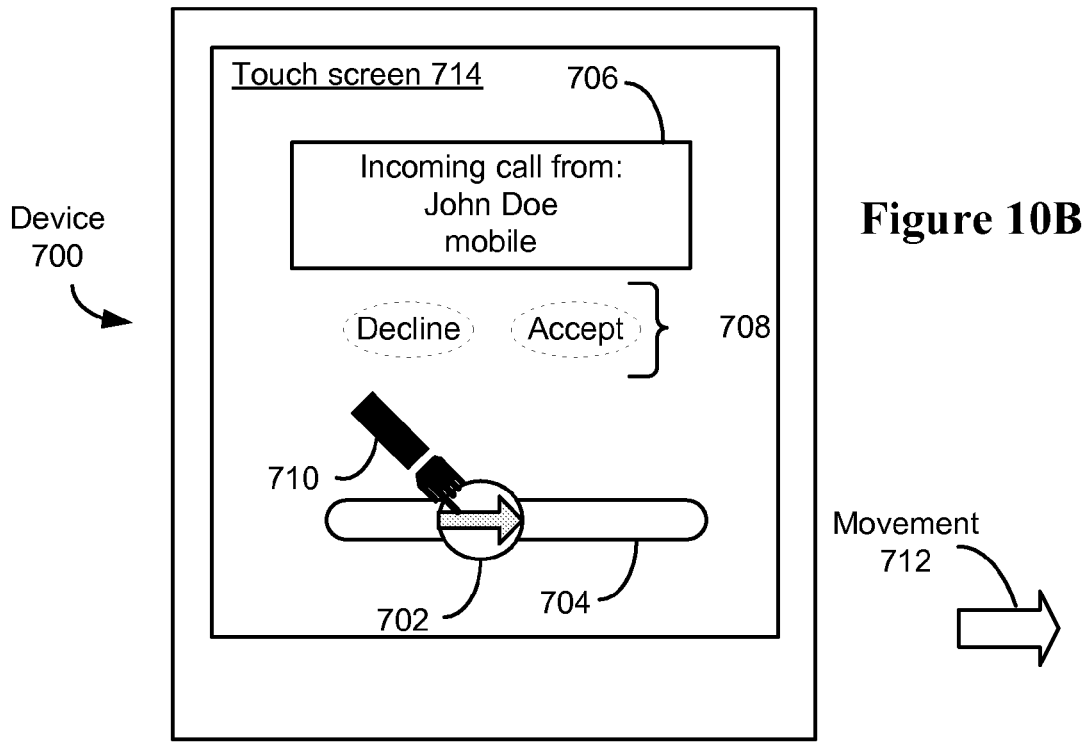
Figure 10C:
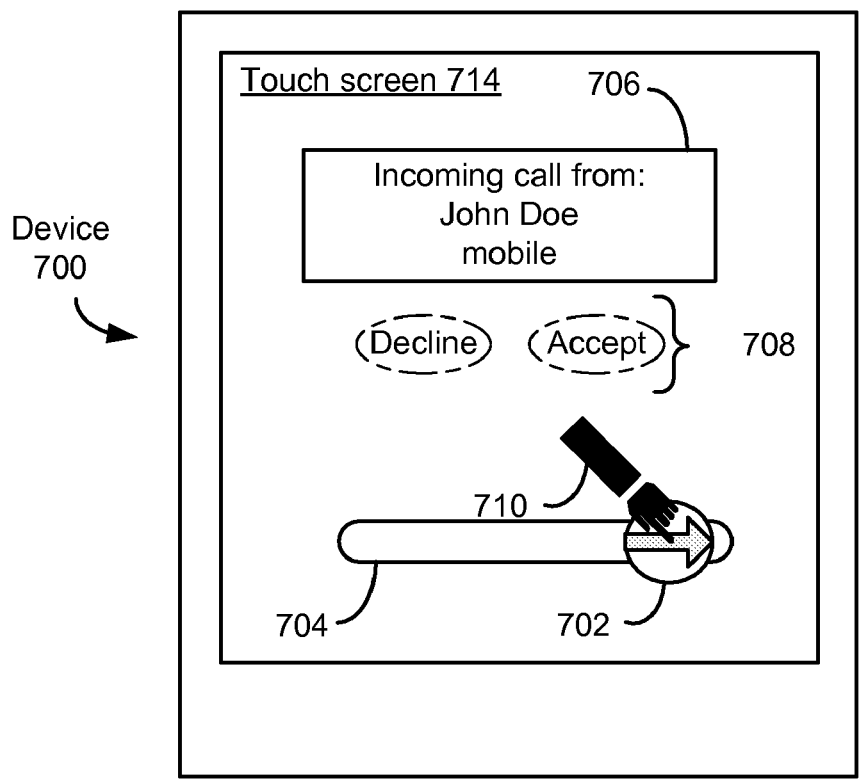

In FIG. 10B, the user is in the process of dragging the unlock image 702 along the channel 704 in the direction of movement 712. As the user drags the unlock image, a set of virtual buttons 708 appears and increases in optical intensity. The virtual buttons 708 are shown with dotted outlines to indicate that they are not yet at their final optical intensity levels. The virtual buttons 708 are associated with the prompt 706; the virtual buttons shown in FIGS. 10B-10D allow the user to decline or accept the incoming call. However, the user cannot interact with the virtual buttons 708 until the device is unlocked and the virtual buttons have reached their final optical intensity. In FIG. 10C, the user drags the unlock image 702 further along the channel 704 in the direction of movement 712. The virtual buttons 708 have increased further in optical intensity relative to their optical intensity in FIG. 10B, as illustrated by their different style of dotted outlines. The increases in optical intensity indicate to the user progress towards completion of the unlock action.

Figure 10D:
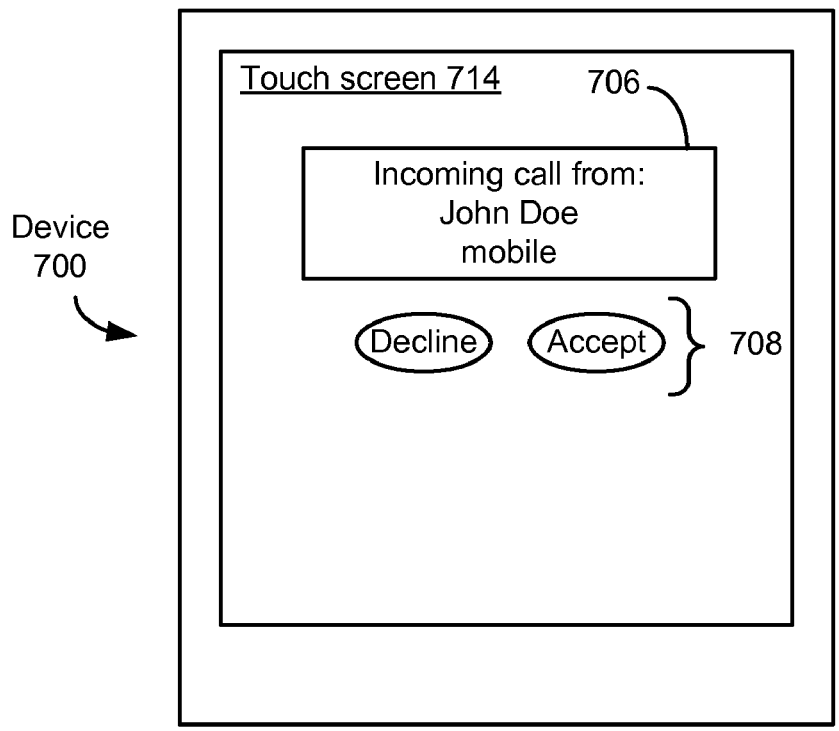

In FIG. 10D, the user completes the unlock action by dragging the unlock image to the right end of the channel 704 and releasing the unlock image 702. The device 700 transitions to the unlock state. The unlock image 702 and the channel 704 disappear from the display and the virtual buttons 708 are at their final optical intensity levels, as illustrated by their solid outlines. At this point the user may interact with the virtual buttons 708 and accept or decline the incoming call.

As described above in reference to FIGS. 5A-5D, if a user-initiated action, such as a power-off action, fails because the user releases the action image prematurely, the action image may return to its original location. In this instance, if the unlock action fails because the user releases the unlock image prematurely, the unlock image may return to its initial location. In some embodiments, the optical intensity of the virtual buttons 708 or other user-interface objects that were increasing in optical intensity as the unlock action was performed may, concurrent with the return of the unlock image to its initial location, have their optical intensity decreased smoothly, back to their initial levels.

Figure 11A:
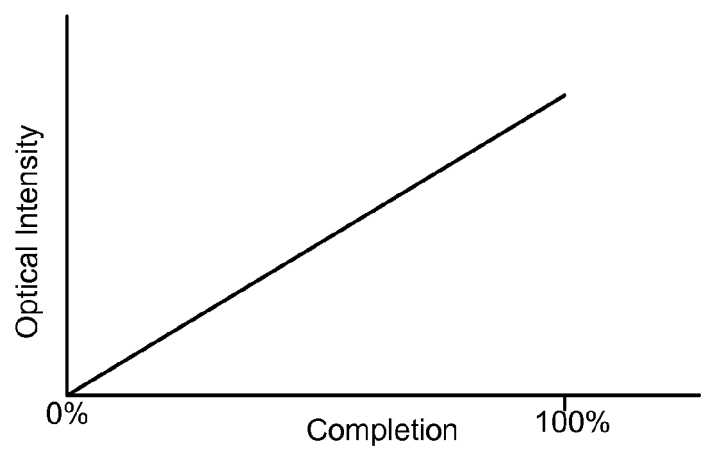
FIGS. 11A-11C are graphs illustrating optical intensity as a function of the completion of the user input condition, according to some embodiments of the invention.
Figure 11B:
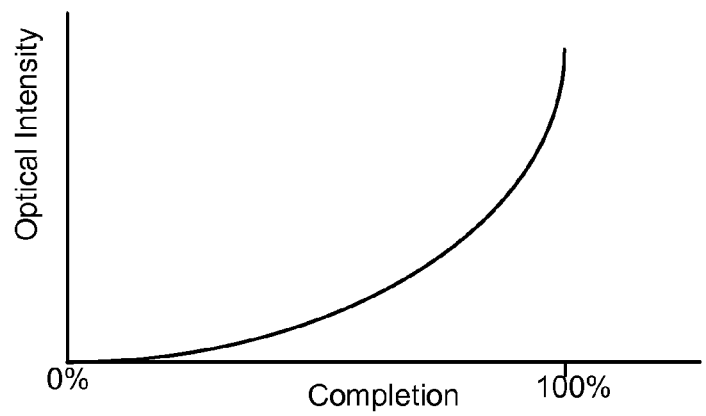
Figure 11C:
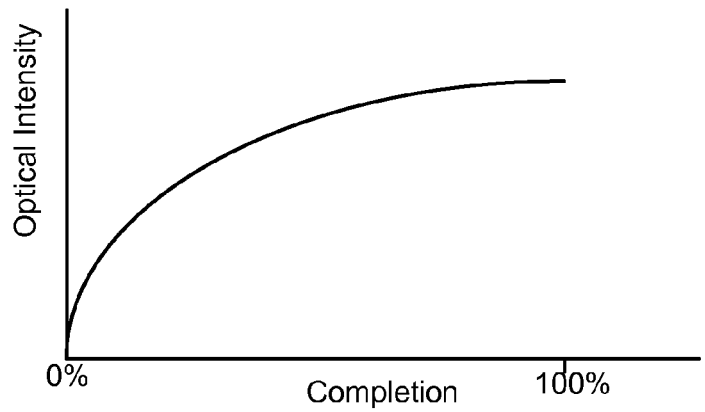

FIGS. 11A-11C are graphs illustrating optical intensity as a function of the completion of the user input condition, according to some embodiments of the invention. In FIG. 11A, the optical intensity is a linear function of the completion of the user input condition. At zero percent (0%) completion, the optical intensity is at an initial value (in this case, the initial value is 0). As the completion percentage increases, the optical intensity increases linearly with the completion percentage, until it reaches the final value at one hundred percent (100%) completion.

In FIG. 11B, the optical intensity is a nonlinear function of the completion of the user input condition. At 0% completion, the optical intensity is at an initial value (in this case, the initial value is 0). As the completion percentage increases, the optical intensity increases gradually at first, but the increase becomes steeper as the completion percentage increases, until it reaches the final value at 100% completion.

In FIG. 11C, the optical intensity is another nonlinear function of the completion of the user input condition. At 0% completion, the optical intensity is at an initial value (in this case, the initial value is 0). As the completion percentage increases, the optical intensity increases steeply at first, but the increase becomes more gradual as the completion percentage increases, until it reaches the final value at 100% completion. In some embodiments, the optical intensity may increase according to a logarithmic scale.

In some embodiments, the optical intensity may reach its final value prior to 100% completion of the user input condition (e.g., at 90% completion).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a portable electronic device with a touch screen display and a power switch:
    while the device is powered-up, detecting activation of the power switch;
    upon activation of the power switch, displaying a power-off user cue that corresponds to a predefined user gesture with the touch screen display;
    wherein the predefined user gesture requires movement from a first location on the touch screen display to a second location on the touch screen display;
    detecting user interaction with the touch screen display; and
    if the user completes the predefined user gesture, completing the power-off action by powering-off the device.

2. The method of claim 1, wherein the power-off user cue comprises at least one of:
    an animation of the predefined user gesture;
    a text description of the predefined user gesture; and
    an illustration of the predefined user gesture.

3. The method of claim 1, further comprising:
    enabling user interaction with the power-off user cue as displayed on the touch screen display; wherein completion by the user of the predefined user gesture comprises the user interacting with the power-off user cue as displayed on the touch screen display.

4. The method of claim 3, wherein the predefined user gesture requires the user to touch a plurality of locations displayed on the touch screen display.

5. The method of claim 4, wherein completion by the user of the predefined gesture requires the user to touch each of the plurality of locations at a separate time.

6. The method of claim 4, wherein completion by the user of the predefined gesture requires the user to touch each of the plurality of locations substantially simultaneously.

7. The method of claim 3, wherein the predefined user gesture requires continuous user contact with the touch screen display as the user makes the predefined user gesture between the first and second locations.

8. The method of claim 7, wherein the continuous user contact with the touch screen display is substantially along the path of the user cue as displayed on the touch screen display.

9. The method of claim 1, wherein the power-off gesture is made with any one of:
    the user's finger in contact with the touch screen; or
    an object in contact with the touch screen.

10. A method, comprising:
    at a portable electronic device with a touch screen display, a power switch and a user interface lock mode:
    when the device is powered-on and in the lock mode:
    detecting activation of the power switch;
    upon activation of the power switch, displaying a power-off user cue that corresponds to a predefined user gesture with the touch screen display;
    wherein the predefined user gesture requires movement from a first location on the touch screen display to a second location on the touch screen display;
    detecting user interaction with the touch screen display; and
    if the user completes the predefined user gesture, completing the power-off action by powering-off the device.

11. The method of claim 10, further comprising:
    during user interaction with the touch screen display during completion of the predefined user gesture, preventing a range of predefined user interactions with the touch screen display.

12. The method of claim 11, wherein the predefined user interactions comprise navigating to applications loaded on the device.

13. A portable electronic device, comprising:
    a touch screen display;
    one or more processors;
    a memory;
    a power switch; and
    one or more programs, wherein the one or more programs are stored in the memory and configured to be executed by the one or more processors, the one or more programs including instructions:
    while the device is powered-up, detecting activation of the power switch;
    upon activation of the power switch, displaying a power-off user cue that corresponds to a predefined user gesture with the touch screen display;
    wherein the predefined user gesture requires movement from a first location on the touch screen display to a second location on the touch screen display;
    detecting user interaction with the touch screen display; and
    if the user completes the predefined user gesture, completing the power-off action by powering-off the device.

14. The portable electronic device of claim 13, wherein the power-off user cue comprises at least one of:
    an animation of the predefined user gesture;
    a text description of the predefined user gesture; and
    an illustration of the predefined user gesture.

15. The portable electronic device of claim 13, further comprising:
    enabling user interaction with the power-off user cue as displayed on the touch screen display; wherein completion by the user of the predefined user gesture comprises the user interacting with the power-off user cue as displayed on the touch screen display.

16. The portable electronic device claim of claim 15, wherein the predefined user gesture requires continuous user contact with the touch screen display as the user makes the predefined user gesture between the first and second locations.

17. A non-transitory computer readable storage medium storing one or more programs, the one or more programs comprising instructions, which when executed by a portable electronic device with a touch screen display and a power switch, cause the portable electronic device to perform a method comprising:
- while the device is powered-up, detecting activation of the power switch;
- upon activation of the power switch, displaying a power-off user cue that corresponds to a predefined user gesture with the touch screen display;
- wherein the predefined user gesture requires movement from a first location on the touch screen display to a second location on the touch screen display;
- detecting user interaction with the touch screen display; and
- if the user completes the predefined user gesture, completing the power-off action by powering-off the device.

18. The non-transitory computer readable storage medium of claim 17, wherein the power-off user cue comprises at least one of:
- an animation of the predefined user gesture;
- a text description of the predefined user gesture; and
- an illustration of the predefined user gesture.

19. The non-transitory computer readable storage medium of claim 17, further comprising:
- enabling user interaction with the power-off user cue as displayed on the touch screen display; wherein completion by the user of the predefined user gesture comprises the user interacting with the power-off user cue as displayed on the touch screen display.

20. The non-transitory computer readable storage medium of claim 19, wherein the predefined user gesture requires continuous user contact with the touch screen display as the user makes the predefined user gesture between the first and second locations.

21. A portable electronic device, comprising:
- a touch screen display;
- one or more processors;
- a memory;
- a power switch;
- a user interface lock mode; and
- one or more programs, wherein the one or more programs are stored in the memory and configured to be executed by the one or more processors, the one or more programs including instructions for:
- when the device is powered-on and in the lock mode:
- detecting activation of the power switch;
- upon activation of the power switch, displaying a power-off user cue that corresponds to a predefined user gesture with the touch screen display;
- wherein the predefined user gesture requires movement from a first location on the touch screen display to a second location on the touch screen display;
- detecting user interaction with the touch screen display; and
- if the user completes the predefined user gesture, completing the power-off action by powering-off the device.

22. A non-transitory computer readable storage medium storing one or more programs, the one or more programs comprising instructions, which when executed by a portable electronic device with a touch screen display and a user lock interface lock mode, cause the portable electronic device to perform a method comprising:
- when the device is powered-on and in the lock mode:
- detecting activation of the power switch;
- upon activation of the power switch, displaying a power-off user cue that corresponds to a predefined user gesture with the touch screen display;
- wherein the predefined user gesture requires movement from a first location on the touch screen display to a second location on the touch screen display;
- detecting user interaction with the touch screen display; and
- if the user completes the predefined user gesture, completing the power-off action by powering-off the device.

\* \* \* \* \*

UNITED STATES PATENT AND TRADEMARK OFFICE
CERTIFICATE OF CORRECTION

| | | |
|---|---|---|
| PATENT NO. | : 7,890,778 B2 | Page 1 of 1 |
| APPLICATION NO. | : 11/770722 | |
| DATED | : February 15, 2011 | |
| INVENTOR(S) | : Steven P. Jobs et al. | |

It is certified that error appears in the above-identified patent and that said Letters Patent is hereby corrected as shown below:

On sheet 3 of 14, in Figure 3, Ref. Numeral 306, line 2, delete "power off" and insert -- power-off --, therefor.

In column 9, line 35, delete "power off" and insert -- power-off --, therefor.

In column 13, line 42, delete "power off" and insert -- power-off --, therefor.

In column 16, line 23-24, delete "count down" and insert -- countdown --, therefor.

In column 22, line 45, in claim 13, delete "instructions:" and insert -- instructions for: --, therefor.

In column 24, line 27, in claim 22, after "user" delete "lock".

Signed and Sealed this
Twenty-second Day of November, 2011

David J. Kappos
*Director of the United States Patent and Trademark Office*